US011269496B2

(12) United States Patent
Toyama

(10) Patent No.: US 11,269,496 B2
(45) Date of Patent: Mar. 8, 2022

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Masaki Toyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/701,775

(22) Filed: Dec. 3, 2019

(65) Prior Publication Data

US 2020/0183550 A1  Jun. 11, 2020

(30) Foreign Application Priority Data

Dec. 6, 2018 (JP) .............................. JP2018-228921

(51) Int. Cl.
*G06F 3/0483* (2013.01)
*H04N 1/00* (2006.01)

(52) U.S. Cl.
CPC ....... *G06F 3/0483* (2013.01); *H04N 1/00429* (2013.01); *H04N 1/00432* (2013.01); *H04N 1/00448* (2013.01)

(58) Field of Classification Search
CPC . G06F 3/0483; G06F 3/0481; H04N 1/00429; H04N 1/00432; H04N 1/00448; H04N 1/00419
See application file for complete search history.

(56) References Cited

U.S. PATENT DOCUMENTS

| 5,745,112 A * | 4/1998 | Hirose ................... G06F 9/451 715/769 |
| 6,433,800 B1 * | 8/2002 | Holtz ................... G06F 3/0486 715/769 |
| 6,795,664 B2 * | 9/2004 | Sugimoto ............ G06K 15/021 399/382 |
| 6,892,376 B2 * | 5/2005 | McDonald ........... G06Q 10/103 707/E17.005 |
| 6,934,046 B1 * | 8/2005 | Nishikawa ............ G06F 3/1205 358/1.15 |
| 7,103,853 B1 * | 9/2006 | Patil ....................... G06F 40/169 715/824 |
| 7,171,620 B2 * | 1/2007 | Castellani .............. G06Q 10/10 715/229 |
| 7,307,751 B2 * | 12/2007 | Aritomi ................. G06K 15/02 358/1.18 |
| 7,536,636 B2 * | 5/2009 | Croft ..................... G06F 40/194 715/229 |
| 7,589,851 B2 * | 9/2009 | De Bie ................. G06F 3/1205 358/1.15 |
| 7,676,512 B2 * | 3/2010 | Yamamoto ........... G06F 3/1204 358/1.15 |

(Continued)

FOREIGN PATENT DOCUMENTS

JP  2016-045770 A  4/2016

*Primary Examiner* — Jung-Mu T Chuang
(74) *Attorney, Agent, or Firm* — Canon U.S.A., Inc. IP Division

(57) ABSTRACT

In a case where a plurality of operation buttons includes a first operation button for executing processing on one piece of page data included in document data, an information processing apparatus displays execution target page data of the first operation button in an identifiable manner.

13 Claims, 18 Drawing Sheets

(56) References Cited

U.S. PATENT DOCUMENTS

| | | | | |
|---|---|---|---|---|
| 7,698,650 B2* | 4/2010 | Holmes | G06Q 10/00 | 715/762 |
| 7,707,505 B1* | 4/2010 | Ohrt | G06F 16/972 | 715/738 |
| 7,761,393 B2* | 7/2010 | Macbeth | G06Q 10/10 | 706/16 |
| 7,827,483 B2* | 11/2010 | Unbedacht | G06F 40/177 | 715/256 |
| 7,921,365 B2* | 4/2011 | Sauve | G06F 3/0482 | 715/738 |
| 7,996,390 B2* | 8/2011 | Freire | G06F 16/35 | 707/722 |
| 8,090,611 B2* | 1/2012 | Hodges | G06Q 10/06 | 705/7.27 |
| 8,090,743 B2* | 1/2012 | Cha | G06F 16/35 | 707/779 |
| 8,132,151 B2* | 3/2012 | Ahern | G06F 9/45512 | 717/115 |
| 8,146,010 B2* | 3/2012 | Scott | G06F 3/0483 | 715/771 |
| 8,151,204 B2* | 4/2012 | Lusen | G06F 3/0483 | 715/769 |
| 8,185,423 B2* | 5/2012 | Brook | G06Q 10/06375 | 705/7.13 |
| 8,224,131 B2* | 7/2012 | Maekawa | G06F 40/263 | 382/321 |
| 8,365,080 B2* | 1/2013 | Karlson | G06Q 10/109 | 715/739 |
| 8,448,060 B2* | 5/2013 | Desmond | G06F 40/174 | 715/223 |
| 8,498,985 B2* | 7/2013 | Spence | G06F 9/453 | 707/737 |
| 8,571,317 B2* | 10/2013 | Welling | G06K 9/00442 | 382/173 |
| 8,736,869 B2* | 5/2014 | Okita | G06F 3/1208 | 358/1.15 |
| 8,793,162 B2* | 7/2014 | King | G06K 9/00442 | 705/26.1 |
| 8,799,186 B2* | 8/2014 | White | G06N 5/04 | 706/11 |
| 8,964,239 B2* | 2/2015 | Prabhu | H04N 1/2166 | 358/1.18 |
| 9,098,794 B2* | 8/2015 | Braun | G06F 3/1248 | |
| 9,113,076 B2* | 8/2015 | King | H04N 1/00758 | |
| 9,235,812 B2* | 1/2016 | Scholtes | G06N 5/02 | |
| 9,245,225 B2* | 1/2016 | Winn | G06Q 10/10 | |
| 9,612,786 B2* | 4/2017 | Kerigan | H04N 1/00222 | |
| 9,766,922 B2* | 9/2017 | Amershi | G06F 11/34 | |
| 9,778,826 B2* | 10/2017 | Anand | G06F 40/169 | |
| 9,818,138 B2* | 11/2017 | Shimkus | G06Q 40/12 | |
| 9,953,019 B2* | 4/2018 | Shimkus | G06F 3/0482 | |
| 10,277,661 B2* | 4/2019 | Maruyama | H04L 67/06 | |
| 10,366,341 B2* | 7/2019 | Weber | G06Q 10/107 | |
| 10,509,799 B2* | 12/2019 | Woodings | G06Q 10/063112 | |
| 2002/0054279 A1* | 5/2002 | Hoshino | H04N 1/00175 | 355/40 |
| 2002/0180822 A1* | 12/2002 | Aritomi | G06K 15/02 | 347/19 |
| 2004/0005164 A1* | 1/2004 | Sugimoto | G06K 15/021 | 399/81 |
| 2004/0130634 A1* | 7/2004 | Delaney | H04N 1/32128 | 348/231.99 |
| 2004/0139401 A1* | 7/2004 | Unbedacht | G06F 3/0484 | 715/273 |
| 2004/0199865 A1* | 10/2004 | Bie | G06F 3/1275 | 715/255 |
| 2005/0008387 A1* | 1/2005 | Sato | G06F 40/103 | 399/81 |
| 2005/0060643 A1* | 3/2005 | Glass | G06F 40/169 | 715/205 |
| 2005/0213819 A1* | 9/2005 | Ikeda | G06K 9/00449 | 382/190 |
| 2005/0262430 A1* | 11/2005 | Croft | G06Q 10/10 | 715/226 |
| 2006/0028689 A1* | 2/2006 | Perry | H04N 1/32144 | 358/3.28 |
| 2006/0072823 A1* | 4/2006 | Maekawa | G06F 40/263 | 382/182 |
| 2006/0224948 A1* | 10/2006 | Desmond | G06F 40/174 | 715/207 |
| 2006/0242180 A1* | 10/2006 | Graf | G06F 16/86 | |
| 2006/0274367 A1* | 12/2006 | Yamamoto | G06F 3/1204 | 358/1.15 |
| 2006/0282504 A1* | 12/2006 | Yoshioka | G06Q 10/10 | 709/207 |
| 2006/0285868 A1* | 12/2006 | Holmes | G06Q 10/00 | 399/81 |
| 2007/0150329 A1* | 6/2007 | Brook | G06Q 10/0875 | 705/7.13 |
| 2007/0237427 A1* | 10/2007 | Patel | G06Q 40/02 | 382/305 |
| 2007/0242282 A1* | 10/2007 | Hashimoto | H04N 1/00957 | 358/1.2 |
| 2007/0244882 A1* | 10/2007 | Cha | G06F 16/35 | |
| 2007/0299795 A1* | 12/2007 | Macbeth | G06Q 10/10 | 706/16 |
| 2008/0005651 A1* | 1/2008 | Grefenstette | G06F 16/30 | 715/234 |
| 2008/0021876 A1* | 1/2008 | Ahern | G06F 16/958 | |
| 2008/0319973 A1* | 12/2008 | Thambiratnam | G06F 16/313 | |
| 2010/0033754 A1* | 2/2010 | Okita | G06F 3/1208 | 358/1.15 |
| 2010/0115450 A1* | 5/2010 | Scott | G06F 3/0483 | |
| 2011/0019020 A1* | 1/2011 | King | G06F 16/31 | 348/222.1 |
| 2011/0022536 A1* | 1/2011 | Shivers | G06Q 30/06 | 705/344 |
| 2011/0211212 A1* | 9/2011 | Berard | H04N 1/00347 | 358/1.13 |
| 2011/0255788 A1* | 10/2011 | Duggan | G06K 9/48 | 382/190 |
| 2011/0255794 A1* | 10/2011 | Neogi | G06K 9/48 | 382/203 |
| 2012/0151386 A1* | 6/2012 | Sun | G06F 16/93 | 715/760 |
| 2012/0198342 A1* | 8/2012 | Mahmud | G06F 8/30 | 715/733 |
| 2012/0290662 A1* | 11/2012 | Weber | G06Q 10/107 | 709/206 |
| 2013/0054302 A1* | 2/2013 | Mueller | G06Q 40/04 | 705/7.28 |
| 2013/0054437 A1* | 2/2013 | Mueller | G06Q 10/06 | 705/35 |
| 2013/0094052 A1* | 4/2013 | Tachibana | H04N 1/00427 | 358/1.15 |
| 2013/0312083 A1* | 11/2013 | Farraro | G06F 3/04883 | 726/16 |
| 2014/0019979 A1* | 1/2014 | Amershi | G06F 11/3438 | 718/101 |
| 2014/0040786 A1* | 2/2014 | Swanson | G06F 3/0484 | 715/760 |
| 2014/0156567 A1* | 6/2014 | Scholtes | G06N 5/02 | 706/12 |
| 2014/0156686 A1* | 6/2014 | Woodings | G06F 16/258 | 707/756 |
| 2014/0253947 A1* | 9/2014 | Akutsu | H04N 1/00973 | 358/1.14 |
| 2014/0337728 A1* | 11/2014 | Urman | H04L 67/10 | 715/709 |
| 2014/0351189 A1* | 11/2014 | Winn | G06N 3/08 | 706/21 |
| 2015/0156354 A1* | 6/2015 | Yamamoto | H04N 1/00408 | 358/1.15 |
| 2015/0229795 A1* | 8/2015 | Wang | H04N 1/32496 | 358/1.13 |
| 2016/0162128 A1* | 6/2016 | Hansen | G06F 8/38 | 715/747 |

(56) References Cited

U.S. PATENT DOCUMENTS

| | | | |
|---|---|---|---|
| 2016/0171626 A1* | 6/2016 | Shimkus | G06Q 10/10 |
| | | | 705/26.35 |
| 2017/0010842 A1* | 1/2017 | Kerigan | G06Q 10/10 |
| 2017/0060815 A1* | 3/2017 | Maruyama | G06F 40/166 |
| 2020/0183550 A1* | 6/2020 | Toyama | G06F 3/0483 |

* cited by examiner

FIG.7A

```
<AddableList>
    <Button Function="open" Name="OPEN DOCUMENT" />
    <Button Function="convertPDF" Name="CONVERT INTO PDF" />
    <Button Function="deletePage" Name="DELETE PAGE" />
    <Button Function="rotatePage" Param="90" Name="ROTATE PAGE" />
    <Button Function="deleteFrame" Name="DELETE FRAME" />
    ...
</AddableList>
```

```
<TabList>
    <Tab ID="Tab001" Name="ORDER RECEIPT STAMP A">
        <Button ID="Button001" Name="ORDER RECEIPT STAMP" Function="pushStamp" Param="stamp001" />
        <Button ID="Button002" Name="PRINT" Function="printPage" />
    </Tab>
    <Tab ID="Tab002" Name="ORDER RECEIPT STAMP B">
        <Button ID="Button003" Name="SCAN" Function="scanDocument" />
        <Button ID="Button004" Name="SPLIT PER PAGE" Function="splitPerPage" />
        <Button ID="Button005" Name="ORDER RECEIPT STAMP" Function="pushStamp" Param="stamp002" />
    </Tab>
    <Tab ID="Tab003" Name="DELETE COVER">
        <Button ID="Button006" Name="IMPORT" Function="importFile" />
        <Button ID="Button007" Name="SPLIT PER PAGE" Function="splitPerPage" />
        <Button ID="Button008" Name="DELETE PAGE" Function="deletePage" />
        <Button ID="Button009" Name="GATHER PAGES" Function="gatherPages" />
    </Tab>
</TabList>
```

707 708 709 706

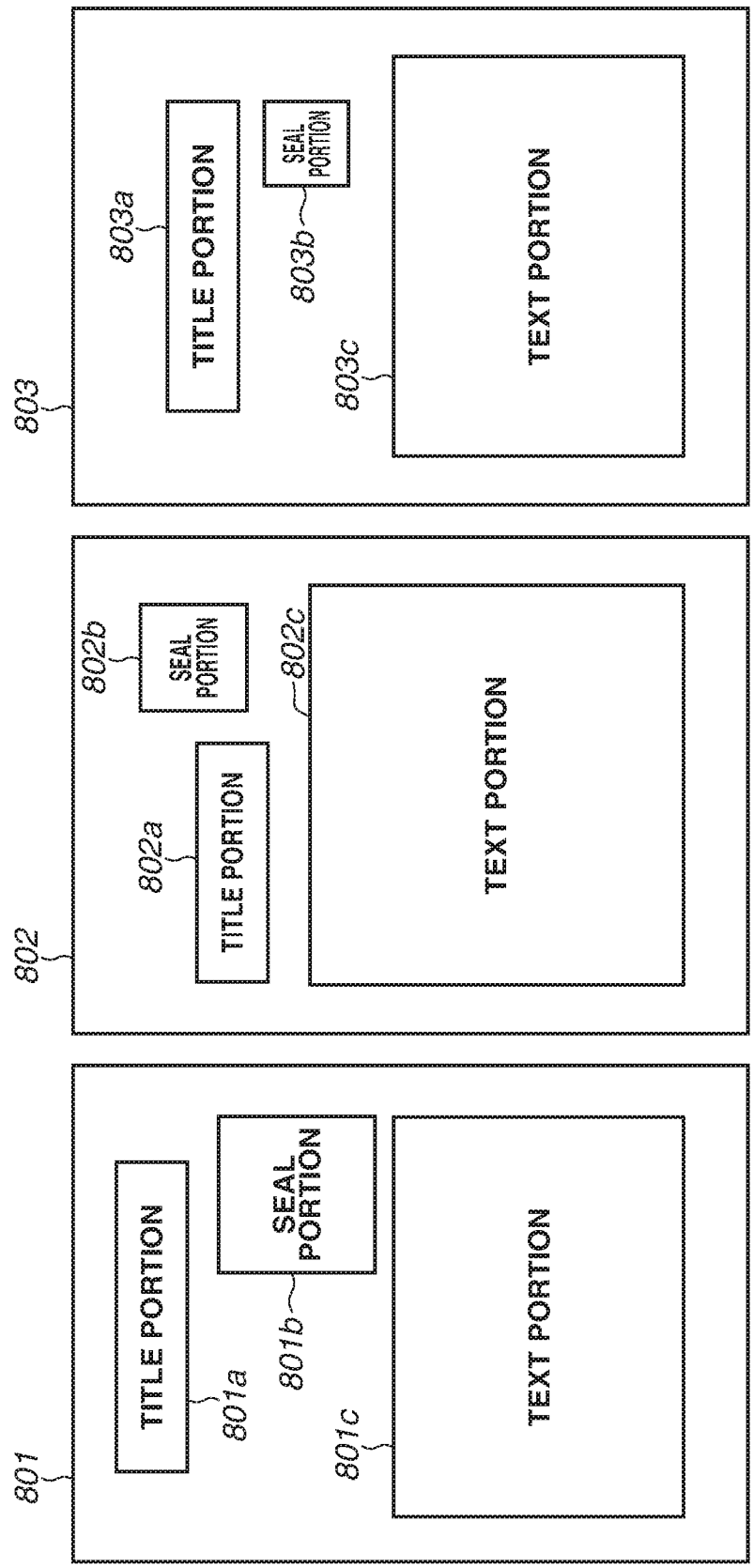

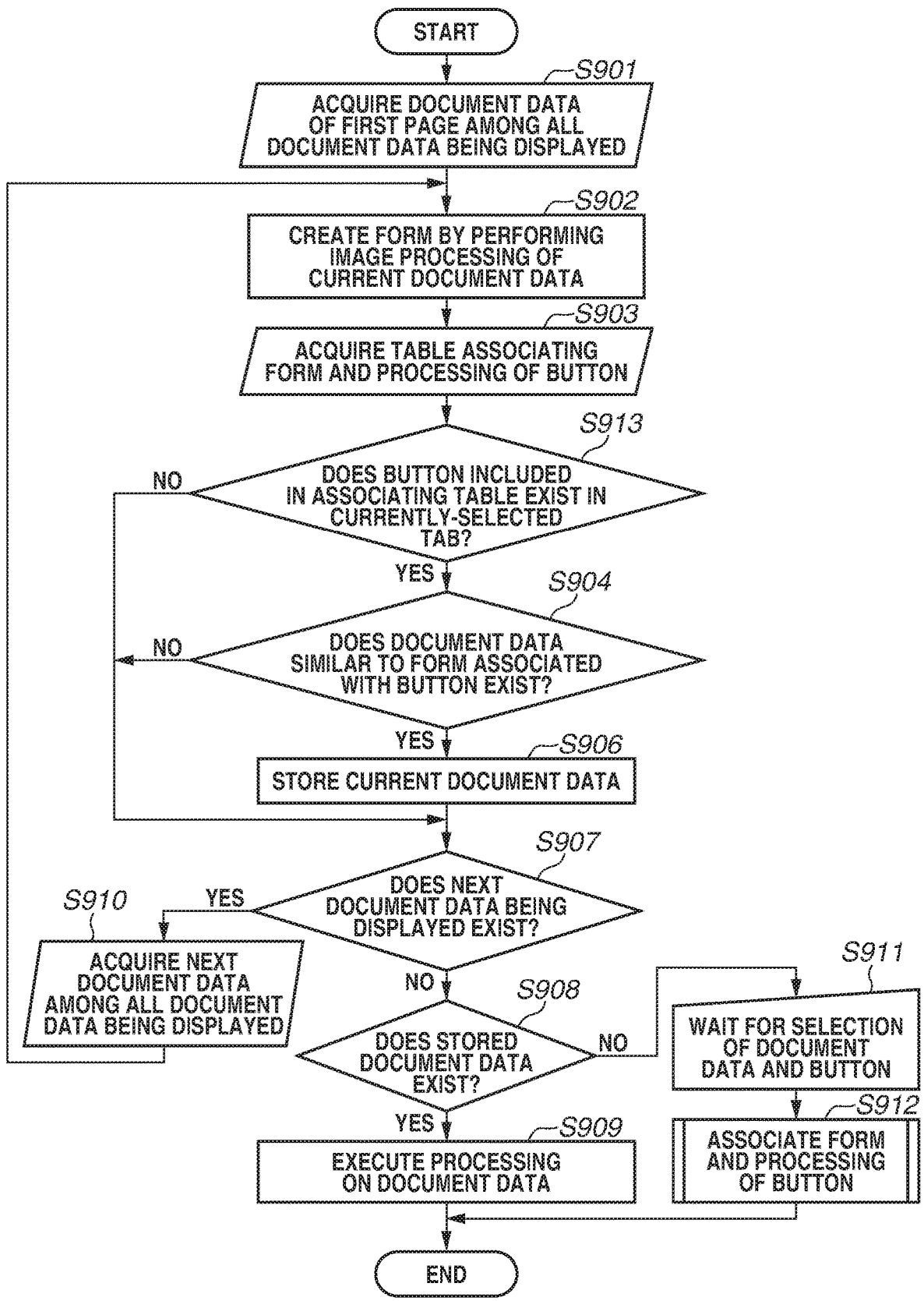

APPLY PROCESSING OF BUTTON "ORDER RECEIPT STAMP" TO DOCUMENT "201806251300.pdf"?

YES  NO

DOCUMENT LIST 201806251300.pdf
201806251400.pdf

APPLY PROCESSING OF BUTTON "ORDER RECEIPT STAMP" TO DOCUMENTS IN LIST?

YES  NO

INFORMATION PROCESSING APPARATUS, CONTROL METHOD, AND STORAGE MEDIUM

BACKGROUND

Field of the Disclosure

The present disclosure relates to an information processing apparatus, a control method, and a storage medium that present an operation to be performed on document data.

Description of the Related Art

Among applications that execute processing on document data, there exists an application that can customize a user interface in accordance with the setting made by a user. For example, a user can freely create and arrange a button corresponding to each piece of processing of an application, on a user interface (UI) of the application. In addition, there also exists an application that can arrange a plurality of buttons created by the user, on a tab created by the user as well. The tab refers to a UI for switching a plurality of buttons being displayed, to a plurality of other buttons to be displayed.

There also exists a system that enhances work efficiency in executing a series of regular operations and reduces work omissions by creating a plurality of buttons and creating a tab on which these buttons are arranged. For example, there is a regular task (FAX order receipt task) such as a task of selecting an order receipt stamp for an order sheet transmitted by a facsimile (FAX), and replying that an order has been received. The regular task includes four operations to be performed on a received FAX document, such as "change of a name (document name)", "order receipt stamp", "FAX transmission", and "save into transmitted (folder)", and the user sequentially performs the works by arranging buttons corresponding to the respective operations (four buttons in this example) on a tab, and sequentially selecting the buttons. Because these operations include an operation requiring the acceptance or the check of the user (e.g., "order receipt stamp"), in many cases, these operations are executed not fully automatically but manually.

For performing these manual operations more efficiently, and avoiding operation omissions, Japanese Patent Application Laid-Open No. 2016-45770 discusses a system that arranges a plurality of buttons corresponding to the respective operations, on one tab.

Among the buttons displayed on the tab, a button for executing processing on one piece of page data exists. For example, processing of an "order receipt stamp" button is executed only on page data selected by the user from among pieces of document data. In other words, in a case where such a button is included in a tab, the user needs to confirm page by page whether corresponding page data is page data on which processing of the button is to be executed, which is bothersome for the user.

SUMMARY

The present disclosure is directed to saving the user the trouble of identifying, in a case where a button for executing processing on one piece of page data is included in a tab, execution target page data of the button from among pieces of document data.

According to embodiments of the present disclosure, an information processing apparatus for arranging a plurality of operation buttons for executing processing on document data or page data included in the document data, on a tab, and displaying the plurality of operation buttons includes a management unit configured to manage information regarding a form of the page data selected by a user operation, and processing of a first operation button that is executed on the selected page data, in association with each other, wherein, in a case where newly-acquired document data includes page data having the form managed by the management unit, and the plurality of operation buttons includes the first operation button for executing processing on one piece of page data included in the document data, until a timing at which the first operation button is selected, the page data having the form managed by the management unit that is an execution target of the first operation button is displayed in an identifiable manner.

Further features of the present disclosure will become apparent from the following description of exemplary embodiments with reference to the attached drawings.

BRIEF DESCRIPTION OF THE DRAWINGS

FIGS. 7A and 7B each illustrate an example of custom setting information about a tab.

FIG. 8 is a schematic diagram illustrating a form.

FIG. 9 is a flowchart illustrating a document operation to be performed when a plurality of documents is displayed.

DESCRIPTION OF THE EMBODIMENTS

Hereinafter, exemplary embodiments of the present disclosure will be described using the drawings.

[System Configuration]

Figure 1:
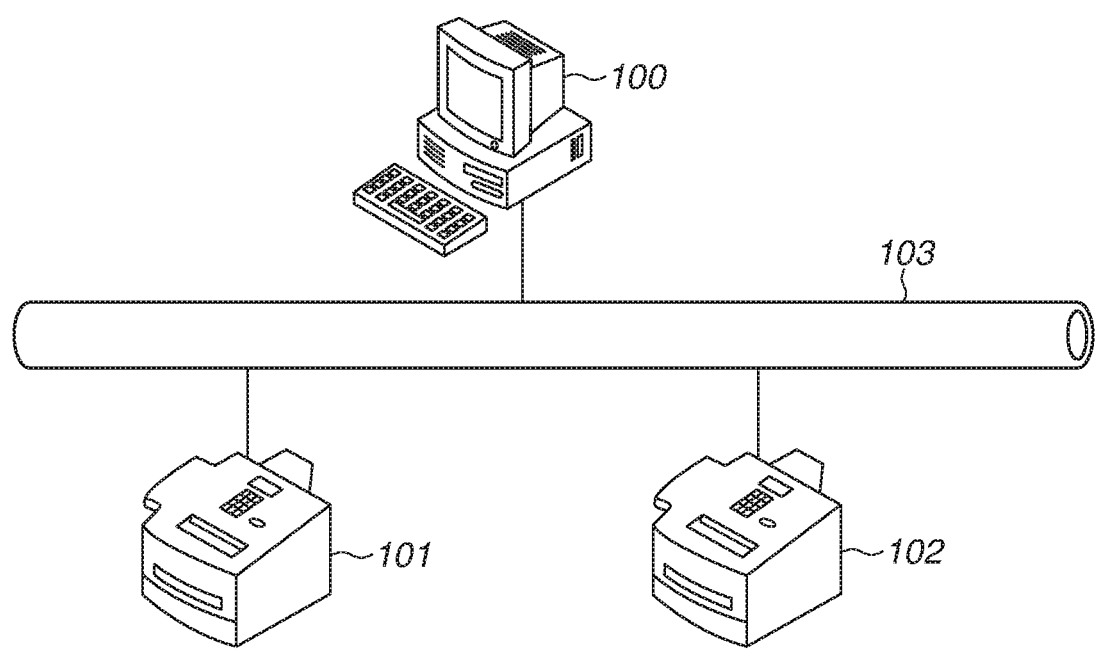
FIG. 1 is a system configuration diagram.

Hereinafter, a first exemplary embodiment will be described. FIG. 1 is a diagram illustrating a configuration of an information processing system according to an exemplary embodiment of the present disclosure.

The present exemplary embodiment relates to a system in which an information processing apparatus 100 and image processing apparatuses 101 and 102 can communicate with each other via a network. In FIG. 1, the information processing apparatus 100 is an information processing apparatus such as a personal computer (PC) to be used by the user, and the information processing apparatus 100 issues a printing instruction or a document scanning instruction to the image processing apparatuses 101 and 102. The image processing apparatuses 101 and 102 have functions such as a printing function, a scanning function, a copy function, and a file transmission function. In addition, on the information processing apparatus 100, a predetermined operating system (OS) is installed and various applications for executing specific functional processing (not illustrated) are also installed. The specific functional processing includes document processing, table calculation processing, presentation processing, image processing, and graphical processing, and each of the applications has a unique data structure (file structure). Furthermore, the OS is configured to refer to an identifier of each file and issue a printing instruction to a corresponding application.

In addition, a document management application 400 for using the image processing apparatus 101 (102) is installed on the information processing apparatus 100 according to the present exemplary embodiment. The document management application 400 has a function of issuing an input-output instruction such as a printing instruction or a document scanning instruction to the image processing apparatus 101 (102), and a function of displaying a usage state of the image processing apparatus 101 (102) or an execution status of an input-output job. A local area network (LAN) 103 connects various apparatuses, and the various apparatuses communicate information with each other via the LAN 103.

FIG. 1 exemplifies two image processing apparatuses 101 and 102, but the number of image processing apparatuses is not especially limited.

[Hardware Configuration (Information Processing Apparatus)]

Figure 2:
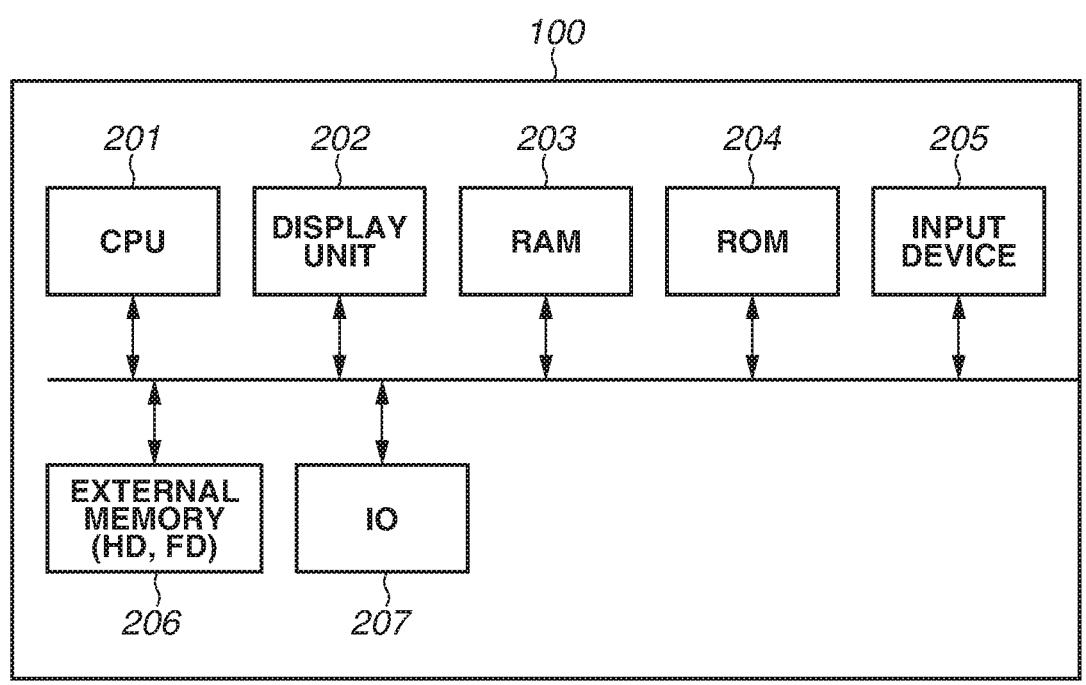
FIG. 2 is a hardware configuration diagram of an information processing apparatus.

FIG. 2 is a diagram illustrating a hardware configuration of the information processing apparatus 100. In FIG. 2, an input device 205 such as a keyboard or a pointing device that receives a user operation input is provided. Furthermore, a display unit 202 that gives a visual output information feedback to the user is included. Furthermore, a random access memory (RAM) 203 for storing various programs and execution information according to the present exemplary embodiment, an external memory 206 such as a hard disk drive (HDD) or a flexible disk drive (FDD), and a read-only memory (ROM) 204 are provided. Further, an interface device input-output (I/O) 207 for communicating with an external device is included, and a central processing unit (CPU) 201 that performs program execution is included. In addition, the connection with a peripheral device may be established in a wired or wireless manner. The information processing apparatus 100 connects with the image processing apparatus 101 (102) via the external device connection interface (I/F).

[Hardware Configuration (Image Processing Apparatus)]

Figure 3:
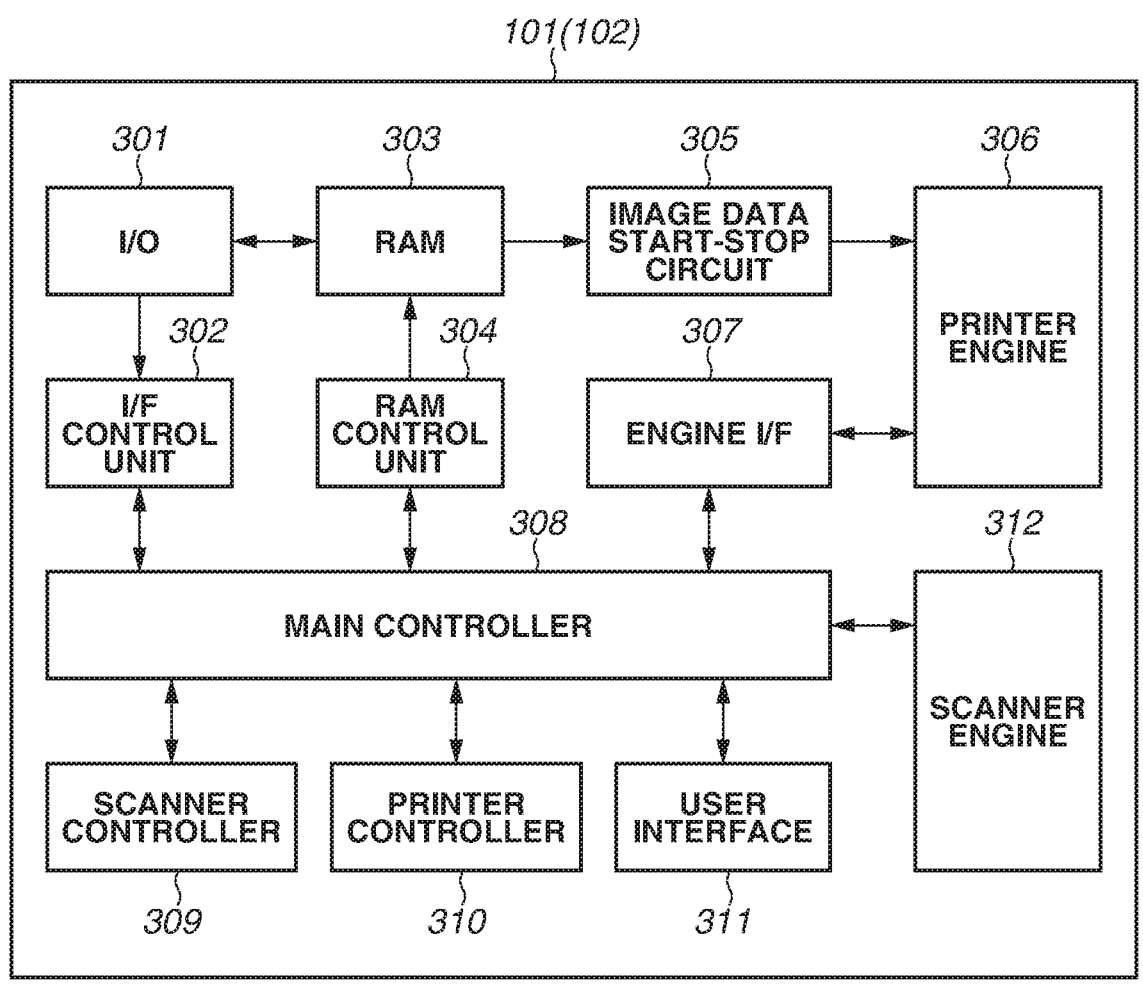
FIG. 3 is a hardware configuration diagram of an image processing apparatus.

FIG. 3 is a block diagram illustrating a hardware configuration of the image processing apparatus 101 (102). In the present exemplary embodiment, an example of a multifunction peripheral (MFP) having a scanning function and a printing function is illustrated.

An I/O 301 connects with the information processing apparatus 100 via a communication medium such as the LAN 103. A plurality of I/Os 301 may be provided so as to support a plurality of connection modes. The image processing apparatus 101 (102) delivers a device ID or a scanned image to the information processing apparatus 100 via the I/O 301. In addition, the image processing apparatus 101 (102) receives various control commands from the information processing apparatus 100 via the I/O 301 and performs processing.

An I/F control unit 302 performs control of issuing a device ID of a processing system such as a scanner (not illustrated) or a printer (not illustrated) that is mounted in the image processing apparatus 101 (102).

A RAM 303 is a primary storage device, and is used for storing external data such as a control command acquired via the I/O 301, or an image read by a scanner engine 312. Furthermore, the RAM 303 is used for storing an image loaded on a printer controller 310 before being delivered to a printer engine 306. A RAM control unit 304 performs allocation management of the RAM 303.

An image data start-stop circuit 305 is a device that outputs an image loaded on the RAM control unit 304 that has been taken in by the printer controller 310 or the scanner engine 312, in accordance with the rotation of the printer engine 306.

The printer engine 306 is a device that develops an image on an output medium such as paper. A main controller 308 performs various types of control of the printer engine 306 via an engine I/F 307. In addition, the main controller 308 is a main control module, and performs processing of appropriately distributing control languages received from the information processing apparatus 100 via the I/O 301, to a scanner controller 309 and the printer controller 310. Furthermore, the main controller 308 receives instructions from these controllers and a user interface 311, and controls the printer engine 306 and the scanner engine 312. By integrating control interfaces between the main controller 308 and various controllers, it becomes possible to mount an extension board that can process a plurality of types of control commands, on one peripheral device. In addition, the main controller 308 also has a function of acquiring a device ID of a currently-mounted extension controller from each controller and managing the device ID.

The scanner controller 309 converts a scan control command received from the information processing apparatus 100 into an internal execution command interpretable by the main controller 308. In addition, the scanner controller 309 converts an image read by the scanner engine 312 into a scan control command.

The printer controller 310 converts a page description language received from the information processing apparatus 100 into an internal execution command including a developed image of a page description language that is interpretable by the main controller 308. The developed image is conveyed to the printer engine 306 and printed on an output medium such as a sheet.

The user interface 311 is used as an input-output unit of a user instruction when various settings of the main controller 308, the scanning function, and the printing function are executed in the image processing apparatus 101 (102).

In accordance with an instruction from the main controller 308, the scanner engine 312 reads an image printed by using an optical device, converts the image into an electric signal, and delivers the electric signal to the main controller 308.

[Software Configuration Diagram]

Figure 4:
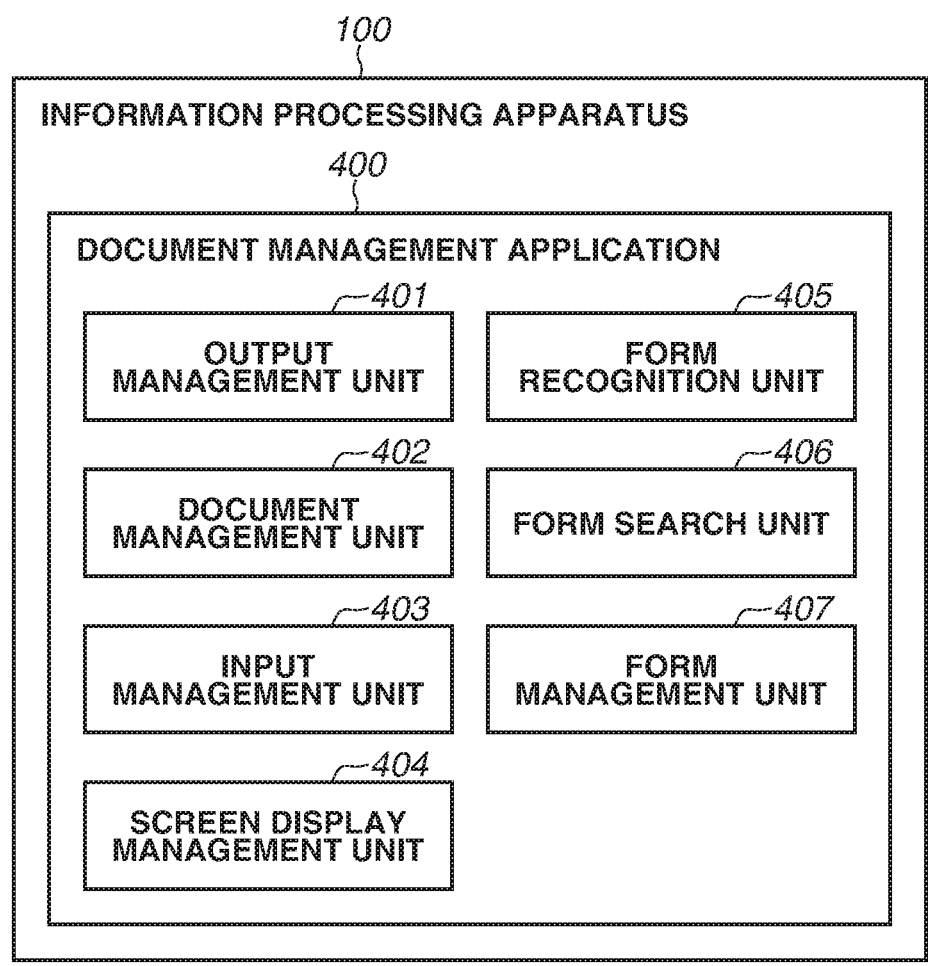
FIG. 4 is a software configuration diagram.

FIG. 4 is a diagram illustrating an example of a functional configuration of the document management application 400 included in the information processing apparatus 100. The document management application 400 is stored in the external memory 206 of the information processing apparatus 100, and implements functions by being loaded on the RAM 203 and the ROM 204 in executing document editing programs, and performing calculation processing in the CPU 201.

The document management application 400 includes an output management unit 401, a document management unit 402, an input management unit 403, a screen display management unit 404, a form recognition unit 405, a form search unit 406, and a form management unit 407.

The output management unit 401 performs processing of outputting document data managed by the document management unit 402 to the image processing apparatus 101 (102). A specific example of the output processing includes printing processing onto a sheet that is performed by the printer controller 310. The document management unit 402 performs the management of document information. The document information includes property information, an index, and a thumbnail image of document data.

The input management unit 403 has a function of detecting an operation of the input device 205 that is performed by the user and acquiring operation information about the user, via a graphical user interface (GUI) of the document management application 400 that is displayed by the screen display management unit 404. In addition, the input management unit 403 also has a function of managing operation log information about the document management application 400, and a function of receiving input processing from the image processing apparatus 101 (102). A specific example of the input processing includes input processing of scan data acquired by the scanner controller 309.

The screen display management unit 404 has a function of performing screen display control of display on the GUI of the document management application 400. In addition, the screen display management unit 404 also has a function of managing addable button information 700 and tab setting information 706 of the document management application 400.

The form recognition unit 405 has a function of executing creation of a recognition form and form recognition processing using the created recognition form. The form search unit 406 has a function of searching for form information corresponding to document data by inquiring of the form management unit 407. The form information is information obtained by digitizing a feature amount extracted from document data, and is used for determining a similarity degree of document data. In the following exemplary embodiments, for the sake of explanatory convenience, scan data acquired by the scanner controller 309 will be referred to as "document data", and the form information is assumed to be information indicating a feature amount of the document data. The document data may include images such as photographs or graphs instead of character strings.

The form management unit 407 manages form information corresponding to document data. The form information is stored into the external memory 206 of the information processing apparatus 100.

[Display Screen of Application]

Figure 5A:
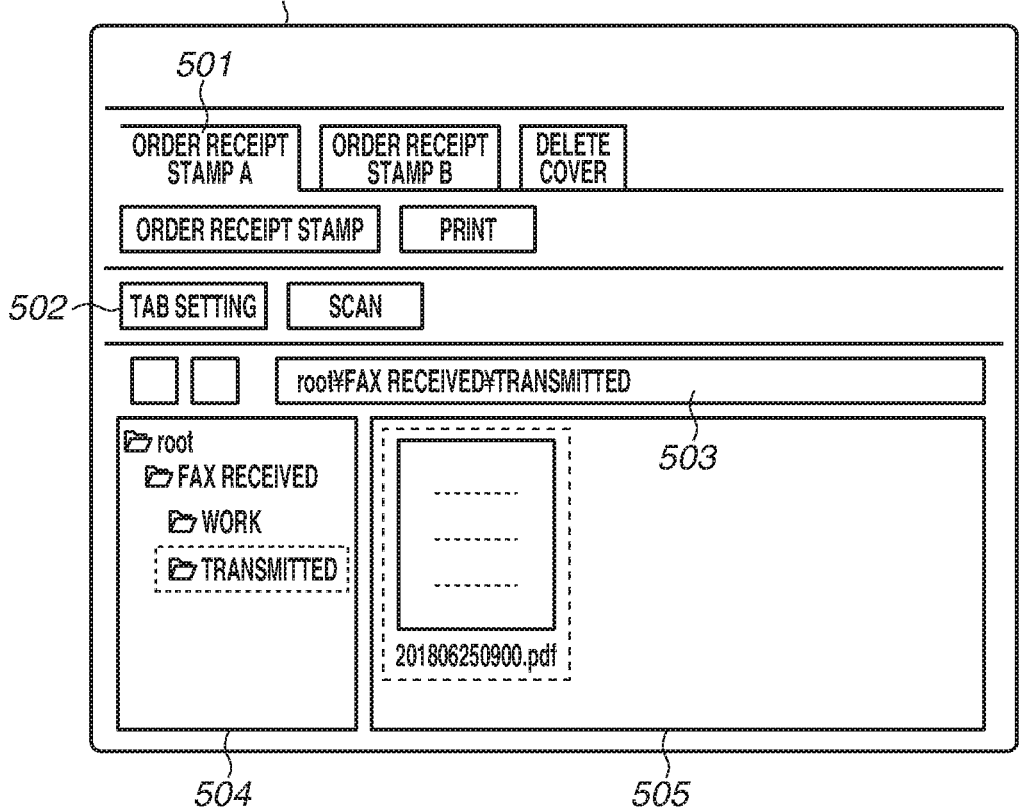
FIGS. 5A-5E each illustrate an example of a display screen of an application.
Figure 5B:
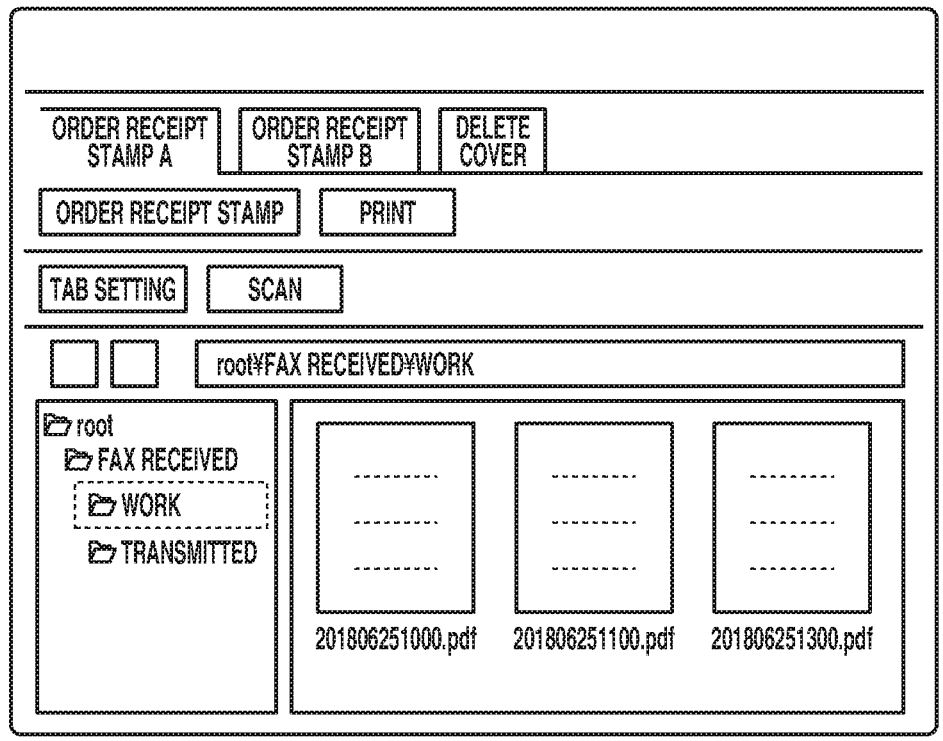
Figure 5C:
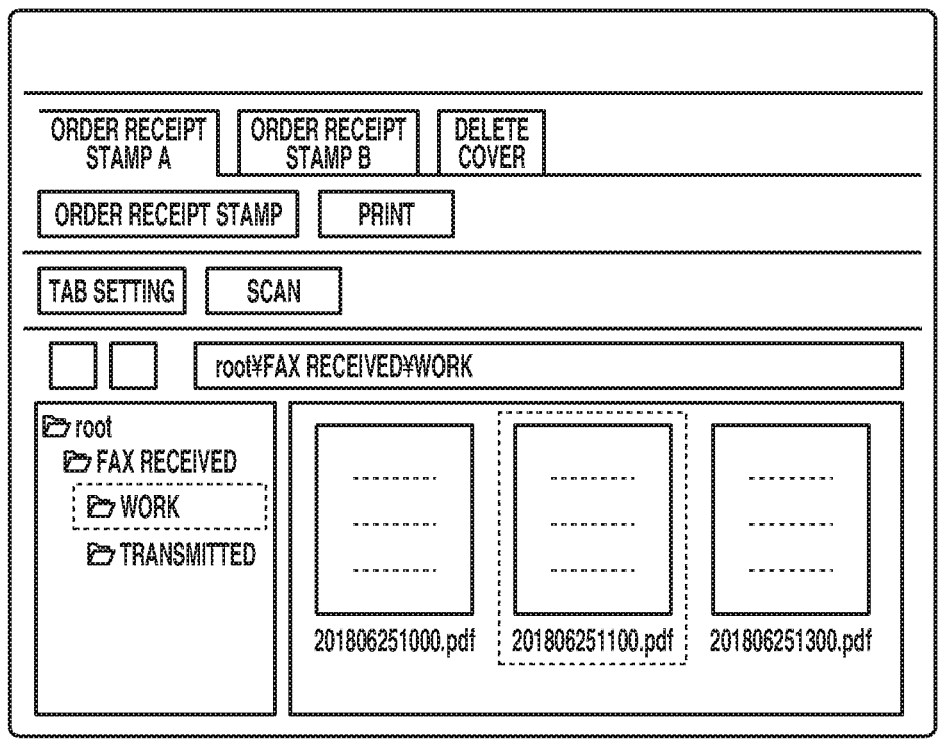
Figure 5D:
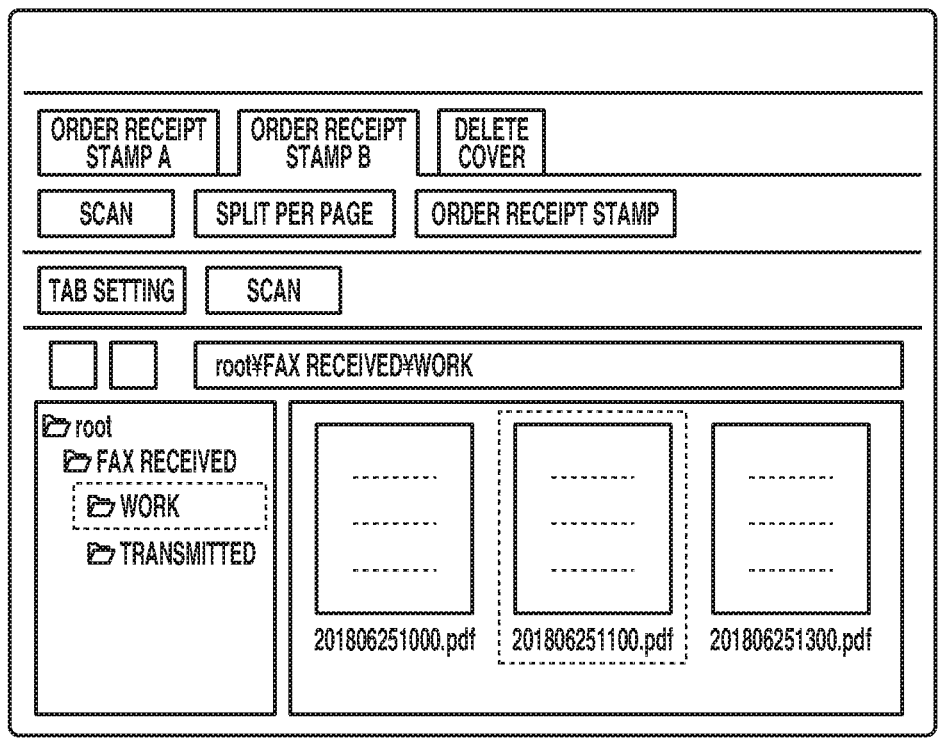
Figure 5E:
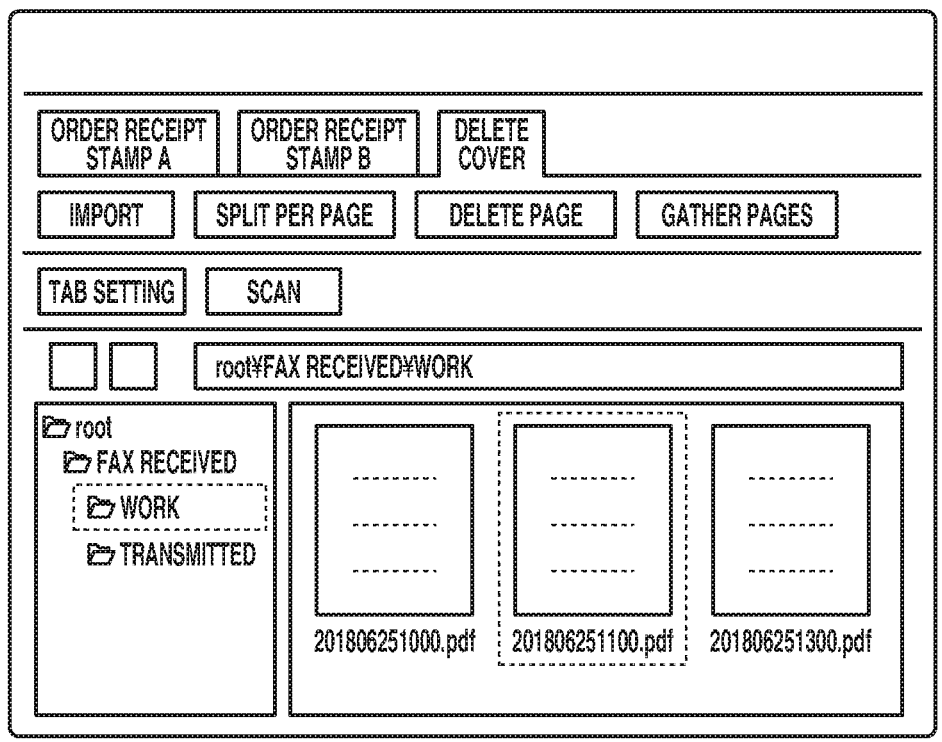

FIGS. 5A to 5E are diagrams schematically illustrating display screens of the document management application 400, which are display screens to be displayed on the display unit 202 of the information processing apparatus 100. FIG. 5A illustrates a selected state of document data corresponding to one page, and FIG. 5B illustrates a state in which document data corresponding to a plurality of pages is displayed. FIG. 5C illustrates a state in which document data corresponding to one page is selected from among the of document data corresponding to the plurality of pages. FIGS. 5D and 5E illustrate respective states in which different tabs "order receipt stamp B" and "delete cover" are selected. In the present exemplary embodiment, page data included in document data will be referred to as a "page" for the sake of explanatory convenience.

First of all, a display screen of the document management application 400 will be described using FIG. 5A. On the display screen, a main window 500 is displayed by the OS.

A tab list 501 is a list of tabs, and a plurality of edition buttons is arranged on each of the tabs. When a tab is selected, a list of edition buttons arranged on the selected tab is displayed. In the example illustrated in FIG. 5A, an "order receipt stamp A" tab, an "order receipt stamp B" tab, and a "delete cover" tab are displayed. In the examples illustrated in FIGS. 5A-5C, the "order receipt stamp A" tab is selected, and an "order receipt stamp" button and a "print" button arranged on the "order receipt stamp A" tab are displayed.

When the "order receipt stamp" button is selected, an order receipt stamp can be inserted into a page in a selected state among pieces of document data. As for an insertion position of the order receipt stamp, the user may be enabled to designate a position on which the order receipt stamp is selected, or the order receipt stamp may be automatically inserted onto a preset position. In addition, in a case where the "order receipt stamp" button is selected without selecting a specific page, processing corresponding to the button (selection processing of the order receipt stamp in this case) is executed on all pages of pieces of document data displayed in a document display region 505. The same applies to the other buttons.

When the "print" button is selected, a page in a selected state among pieces of document data can be printed by the image processing apparatus 101 (102).

In the example illustrated in FIG. 5D, a "scan" button, a "split per page" button, and an "order receipt stamp" button are arranged on the "order receipt stamp B" tab. When the "scan" button is selected, a document can be scanned using the image processing apparatus 101 (102), and document data acquired by the scanning processing can be managed by the document management unit 402. When the "split per page" button is selected, document data in a selected state or document data displayed in the document display region 505 can be split per page, and resultant data can be redisplayed as different files.

In the example illustrated in FIG. 5E, an "import" button, a "split per page" button, a "delete page" button, and a "gather pages" button are arranged on the "delete cover" tab. When the "import" button is selected, a file selected in a file selection dialog (not illustrated) on the OS can be used as document data to be managed by the document management unit 402. When the "delete page" button is selected, a page in a selected state can be deleted.

On a toolbar 502 in FIGS. 5A to 5E, a "tab setting" button and a "scan" button are arranged in the example illustrated in FIG. 5A. When the "tab setting" button is selected, a dialog for performing a custom setting of tabs of the document management application 400 is displayed, and the custom setting of the tabs in the tab list 501 can be performed. Processing to be executed by selecting the "scan" button on the toolbar 502 is the same as processing to be executed by selecting the "scan" button on the tab.

An address bar 503 is a region in which a folder path of a folder to be managed by the document management unit 402 of the document management application 400 is displayed. Specifically, a folder path indicating a folder selected in a folder tree display region 504 is displayed. The folder tree display region 504 is a region in which a hierarchical tree of a folder to be managed by the document management unit 402 of the document management application 400 is displayed. In the example illustrated in FIG. 5A, a state in which a folder path "root\FAX received\transmitted" is displayed is illustrated. In the examples illustrated in FIGS. 5B to 5E, a state in which a folder path "root\FAX received\work" is displayed is illustrated. In the case of the example illustrated in FIG. 5A, a folder "transmitted" is in a selected state, and document data stored in the corresponding folder is displayed in the document display region 505.

The document display region 505 is a region in which document information about document data stored in a folder to be managed by the document management unit 402 of the document management application 400 is displayed. In the present exemplary embodiment, a thumbnail image is displayed in the document display region 505 as document information, but property information or an index of document data may be displayed in the document display region 505 as document information.

In the folder tree display region 504, folders are display in a tree structure. In the example illustrated in FIG. 5A, a thumbnail image of document data stored in the folder "root\FAX received\transmitted" is displayed. In the example illustrated in FIG. 5B, a state is illustrated in which thumbnail images representing pieces of document data corresponding to a plurality of pages stored in the folder "root\FAX received/work" are displayed. In the examples illustrated in FIGS. 5C to 5D, a state is illustrated in which document data named "201806251100.pdf" is selected from among the pieces of document data corresponding to the plurality of pages stored in the folder "root\FAX received\work".

[Dialog of Application]

Figure 6:
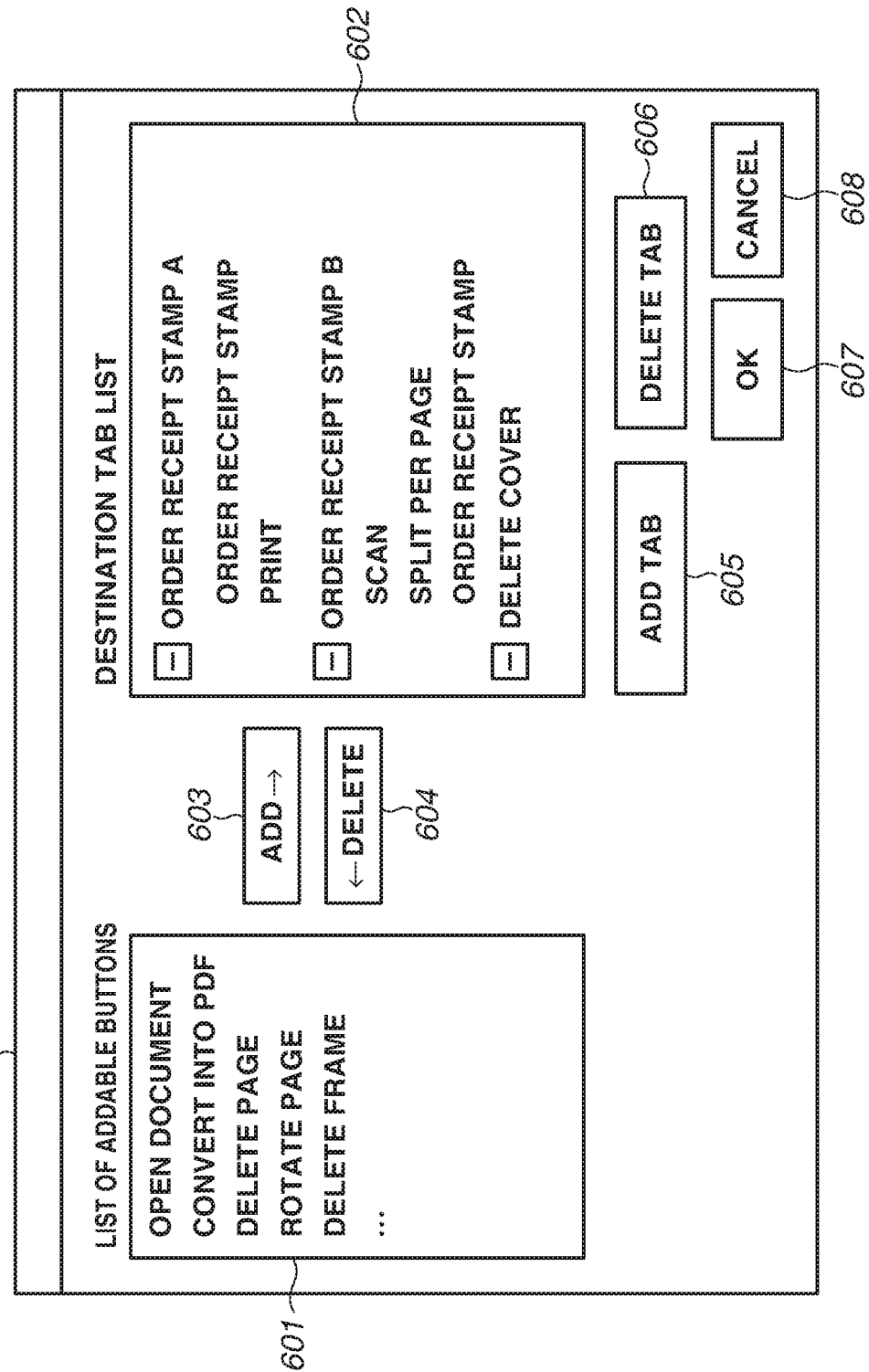
FIG. 6 illustrates an example of a dialog of an application.

FIG. 6 illustrates an example of a dialog for performing a custom setting of tabs of the document management application 400, and the dialog is displayed by selecting the "tab setting" button.

By using a tab custom setting dialog 600, a tab can be added to the tab list 501 or deleted from the tab list 501, and a button can be added to a tab or deleted from a tab. When the settings are made using the tab custom setting dialog 600, set tabs and buttons are reflected in the display screen of the tab list 501.

In a button list 601, a list of buttons addable to a tab is displayed based on the addable button information 700 managed by the screen display management unit 404. In a tab list 602, a list of tabs displayed in the tab list 501 and a list of buttons arranged on each tab are displayed based on the tab setting information 706 managed by the screen display management unit 404. In the example illustrated in FIG. 6, a state of the tabs in the tab list 501 in FIG. 5A is illustrated.

An arbitrary button is selected from the button list 601, and an arbitrary tab is selected from the tab list 602. When a button addition button 603 is pressed in this state, the selected button can be added to the selected tab. The button is added to the end of the buttons arranged on the tab. When a button is added, the name of the button or the name of a tab may be changed, or buttons may be rearranged.

In addition, in a case where a parameter setting is required when a button is to be added, a dialog (not illustrated) for inputting a parameter may be displayed when a button is added. For example, when a "rotate page" button is added to a tab, the user may be prompted to input a rotational angle.

When a button is to be deleted from a tab, by selecting an arbitrary button from the destination tab list 602, and selecting a button deletion button 604, the selected button can be deleted. When a new tab is to be added, by selecting a tab addition button 605, a new tab is added to the destination tab list 602. The added tab is displayed in the tab list 501. If the tab addition button 605 is selected in a state in which a tab is unselected in the destination tab list 602, a new tab is added to the end of the tab list 602. On the other hand, in a case where a tab is selected in the destination tab list 602, a new tab is added after the tab in the selected state.

In a case where a tab is to be deleted, an arbitrary tab is selected from the destination tab list 602, and a tab deletion button 606 is selected. When tabs and buttons set in the tab custom setting dialog 600 are to be applied to the GUI of the main window 500, an OK button 607 is selected. When tabs and buttons set in the tab custom setting dialog 600 are to be cancelled without being applied, a CANCEL button 608 is selected.

[Custom Setting Information about Tab]

FIGS. 7A-7B are diagrams each illustrating an example of information regarding a custom setting of tabs of the document management application 400. FIG. 7A illustrates the addable button information 700 and FIG. 7B illustrates the tab setting information 706. These pieces of information are managed by the screen display management unit 404 of the document management application 400.

The addable button information 700 is information indicating buttons addable onto a tab, and the button list 601 is displayed based on the information. An addable list information tag 701 is a tag for managing a list of buttons to be added. Button information enclosed by the addable list information tags 701 indicates buttons addable onto the tab. A button information tag 702 indicates that enclosed information is information regarding a button arranged on the tab, and includes a function element 703 and a name element 705. The function element 703 indicates processing of a button arranged on the tab. A parameter element 704 indicates a parameter to be delivered when processing corresponding to the function element 703 is executed. For example, processing of the function element 703 having a value "rotatePage" indicates processing of rotating a selected page. In the page rotation processing, a rotational angle can be designated as the parameter element 704. For example, in a case where a value of the parameter element 704 is "90", the page is rotated rightward by 90 degrees. Depending on the processing of the function element 703, some pieces of processing do not require a parameter. In this case, the parameter element 704 needs not be included.

The name element 705 indicates a display name of the button or the tab. For example, in the addable button list 601 illustrated in FIG. 6, the name element 705 of the button information tag 702 included in the addable list information tag 701 in FIG. 7A is displayed.

The tab setting information 706 is information for displaying the tab list 501 of the document management application 400. The example illustrated in FIG. 7B illustrates information regarding tabs displayed in the tab list 501 in FIG. 5A.

A tab list information tag 707 is information regarding the tab list 501. A tab information tag 708 indicates one tab included in the tab list 501. In the example illustrated in FIG. 7B, the tab list 501 includes three tabs including the "order receipt stamp A" tab, the "order receipt stamp B" tab, and the "delete cover" tab. The tab information tag 708 managed in the tab list information tag 707 includes an ID element 709 and the name element 705. The name element 705 is used as a display name to be displayed on the tab list 501. In addition, the button information tag 702 managed in the tab information tag 708 indicates information regarding a button displayed on a tab, and includes the ID element 709, the name element 705, the function element 703, and the parameter element 704.

The ID element 709 indicates unique IDs of a tab and a button. In the example illustrated in FIG. 7B, unique IDs are respectively allocated to three tabs and nine buttons. Specifically, when the button addition button 603 is selected, the button information tag 702 is added to the tab information tag 708, and at the time, an ID not having the same value as the ID element 709 of the existing tab information tag 708 and the existing button information tag 702 is allocated. The same applies to the ID element 709 of the tab information tag 708 to be added when the tab addition button 605 is selected.

[Schematic Diagram of Form]

FIG. 8 is a schematic diagram illustrating a form created by the form recognition unit 405 of the document management application 400. The form refers to a format in which character strings, drawings, tables, images, and the like that have been read from document data are segmented into rectangular regions. For example, forms 801, 802, and 803 each include three rectangular regions. More specifically, the forms 801, 802, and 803 respectively include title portions 801*a*, 802*a*, and 803*a*, seal portions 801*b*, 802*b*, and 803*b*, and text portions 801*c*, 802*c*, and 803*c* that are arranged in different arrangements. In the present exemplary embodiment, it is determined whether a form created from document data as illustrated in FIG. 8 is similar to a form managed in a record (FIG. 9 to be described below). A determination criterion as to whether a plurality of forms is similar to each other is not especially limited.

In addition, the words "title portion", "seal portion", and "text portion" are used in FIG. 8 for the sake of explanatory convenience, but each rectangular region in a form is not always required to have an attribute of information included therein in the present exemplary embodiment. In other words, for example, a form is not always required to have information indicating that a character string is included in the text portion 801*c*, 802*c*, or 803*c*. In addition, a form is not always required to have information indicating that an image of a seal is included in the seal portion 801*b*, 802*b*, or 803*b*.

[Operation Performed on Pieces of Document Data Corresponding to Plurality of Pages]

A flow of operations to be performed on pieces of document data corresponding to a plurality of pages will be described using FIG. 9. This flow is executed upon pieces of document data corresponding to a plurality of pages being displayed in FIG. 5B. As a specific example of the trigger of the processing, this flow is executed in a case where the folder "root\FAX received\work" illustrated in FIG. 5B is selected, or in a case where the user operates the "scan" button on the toolbar 502 and acquires pieces of document data corresponding to a plurality of pages from the image processing apparatus 101 (102), and the acquisition processing is completed.

In step S901, the form recognition unit 405 acquires document data of the first page among pieces of document data corresponding to a plurality of pages displayed in the document display region 505.

In step S902, the form recognition unit 405 creates a form from the acquired document data. In step S903, the form search unit 406 acquires a table associating processing of a button and a form from the form management unit 407. An example of the associating table is shown in Table 1.

TABLE 1

Table associating processing of button and form

| Association ID | Button ID | Form information |
|---|---|---|
| FormButton001 | Button001 | (Columns of form 801, format, coordinate, link to image file, threshold of similarity degree determination, etc.) |

The "form information" in Table 1 includes columns of a form, a format, a coordinate, a link to an image file of a template business form serving as a sample, a threshold of similarity degree determination, and the like. The "button ID" in Table 1 is an identifier (ID) allocated to a button that is indicated in the ID element 709 in FIG. 7B. The "association ID" in Table 1 is an ID for identifying each record in the associating table. In the example in Table 1, a button ID "Button001" is associated with a record having an association ID "FormButton001". It can be seen from FIG. 7B that the button ID "Button001" is an identifier of the "order receipt stamp" button.

Referring back to FIG. 9, in step S913, the form search unit 406 determines whether a button included in the associating table exists in a currently-selected tab. In a case where it is determined that the button exists (YES in step S913), the processing proceeds to step S904, and in a case where it is determined that the button does not exist (NO in step S913), because it is necessary to perform association between form information about document data and an operation button to be executed on the document data, the processing proceeds to step S907. When the determination processing is executed in step S913, a button ID in the associating table and a button ID (Button ID) included in FIG. 7B are referred to. In a case where it is determined in step S913 that the button exists (YES in step S913), the processing proceeds to processing in step S904. In the case of the example illustrated in FIG. 5A, because the "order receipt stamp A" tab being selected includes the "order receipt stamp" button (having a button ID Button001), and the button is a button associated with form information in the associating table, the processing proceeds to step S904.

The tab being selected in the processing is the "order receipt stamp A" tab in a displayed state in the case of the example illustrated in FIG. 5A. In addition, the determination in step S913 is performed based on whether the corresponding button is included in the currently-selected tab, but the determination may be performed based on whether the corresponding button is included in any of the tabs being displayed on the main window 500 (e.g., "order receipt stamp A" tab, "order receipt stamp B" tab, "delete cover" tab).

In step S904, the form search unit 406 identifies, from the associating table, a form associated with a button included in both of the associating table and the tab being displayed, and determines whether document data having the form exists in the document display region 505. In a case where it is determined that the corresponding document data exists (YES in step S904), the processing proceeds to step S906, and in a case where it is determined that the corresponding document data does not exist (NO in step S904), the processing proceeds to step S907. In step S906, the form search unit 406 temporarily stores the document data acquired in step S901.

In step S907, the form recognition unit 405 confirms whether document data corresponding to the next page exists in the document display region 505. In a case where document data corresponding to the next page does not exist (NO in step S907), the processing proceeds to step S908. In a case where document data corresponding to the next page exists (YES in step S907), the processing proceeds to step S910.

In step S908, the form search unit 406 confirms whether the document data temporarily stored in step S906 exists. In a case where one or more pieces of document data temporarily stored in step S906 exist (YES in step S908), the processing proceeds to step S909. In a case where temporarily-stored document data does not exist (No in step S908), the processing proceeds to step S911.

In step S909, the document management unit 402 executes the processing of the button identified in step S913 on the document data temporarily stored in step S906. An execution timing of the processing is a timing at which the user selects the corresponding button. In the case of the example illustrated in FIG. 7B, the processing of "push-Stamp" associated with "Button001" is executed on the document data temporarily stored in step S906.

Because the buttons arranged in the tab list 501 are buttons corresponding to pieces of processing to be regularly performed by the user, the user is expected to execute processing while checking execution target document data and details of processing to be executed by the button. Thus, although processing corresponding to a button may be executed in step S909 without asking the user, the processing may be executed after the user is prompted to check execution target document data and details of processing to be executed by the button.

Figure 11A:
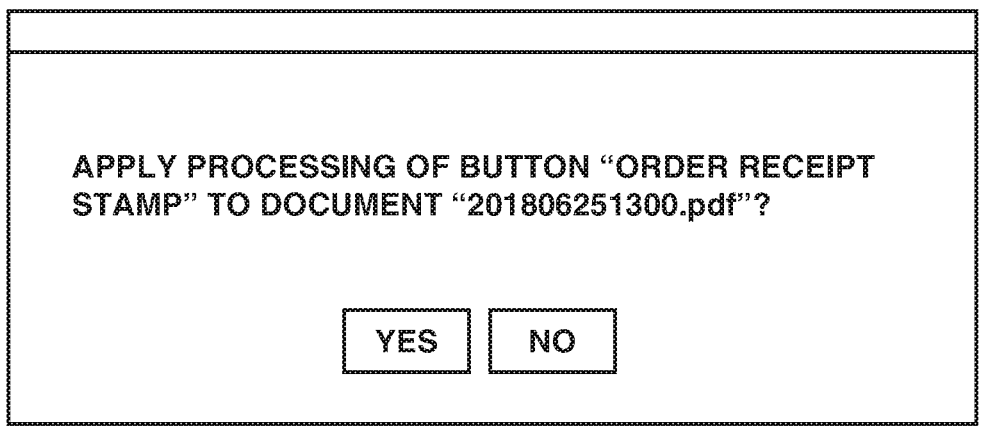
FIGS. 11A and 11B each illustrate a message for asking the user whether to execute processing.
Figure 11B:
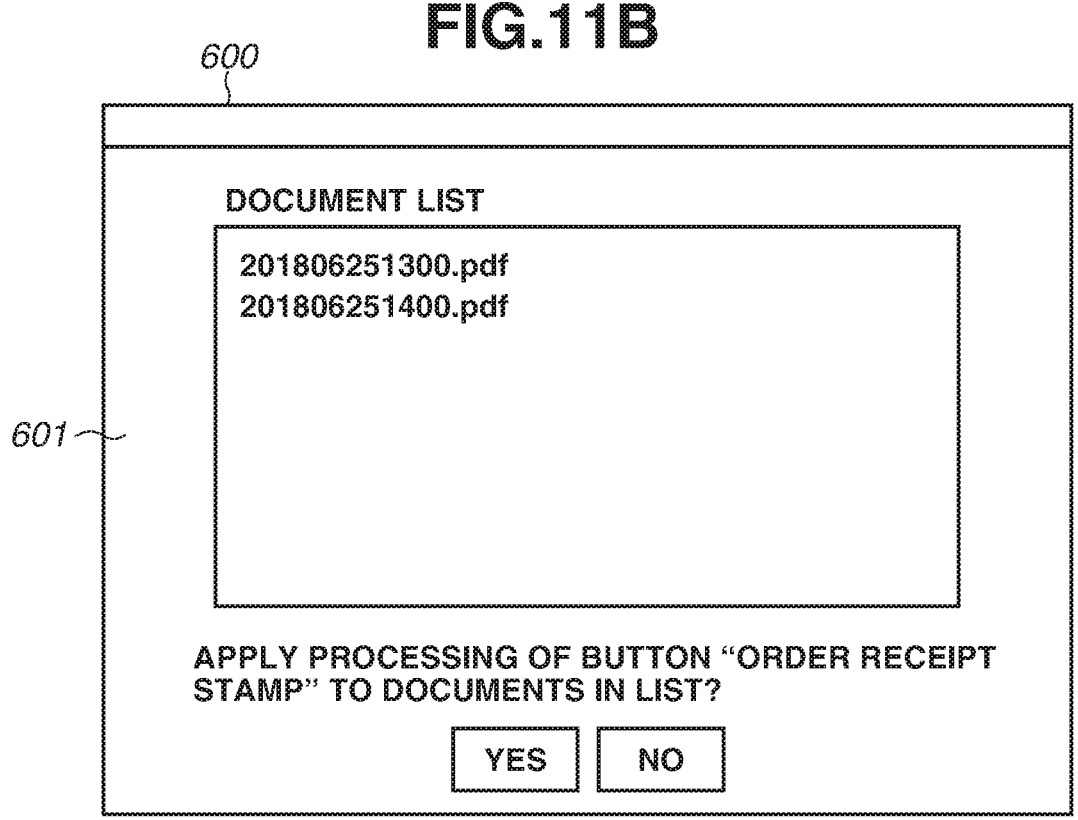

FIGS. 11A and 11B each illustrate an example of a message to be displayed when the user is prompted to check an execution target and the details of processing to be executed. The processing may be executed while checking, page by page, execution targets by displaying a message as illustrated in FIG. 11A. Alternatively, a list of pieces of execution target document data (document data stored in step S906) may be displayed as illustrated in FIG. 11B, and the pieces of document data may be collectively checked. The pieces of document data displayed as a list in FIG. 11B correspond to pieces of document data temporarily stored in step S906.

Referring back to FIG. 9, in a case where it is determined in step S907 that document data corresponding to the next page exists (YES in step S907), in step S910, the form recognition unit 405 acquires document data corresponding to the next page among a plurality of pieces of document data being displayed in the document display region 505.

In a case where it is determined in step S908 that temporarily-stored document data does not exist (NO in step S908), in step S911, the document management application 400 waits for the selection operation of document data in the document display region 505 and the selection operation of a button arranged on a tab in the tab list 501. In step S912, the form management unit 407 adds, to the associating table as a record, form information about document data selected by the user in the document display region 505, and processing of a button that has been executed on the document data selected by the user, in association with each other.

[Processing of Associating Form and Processing of Button]

Figure 10:
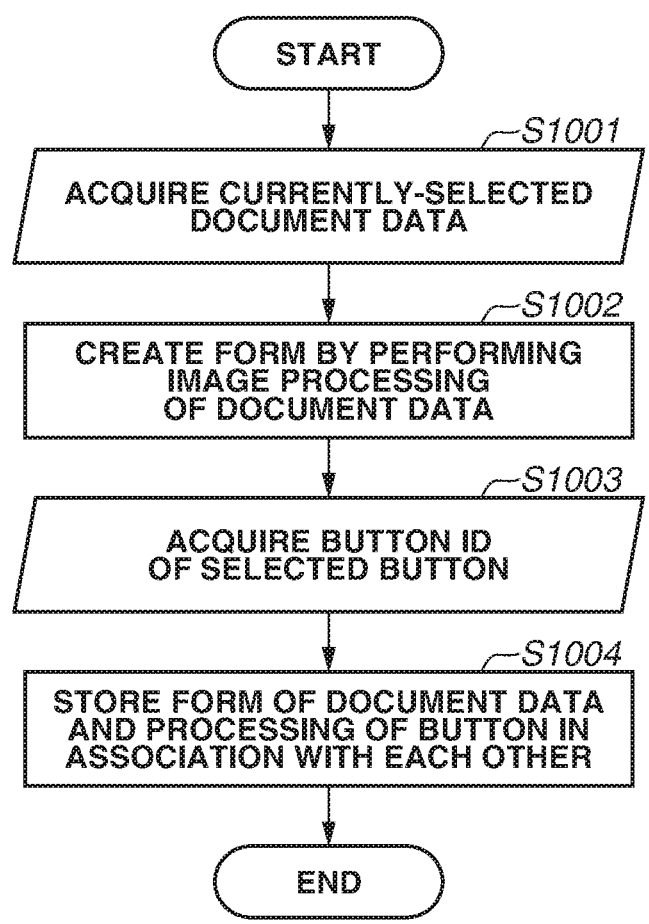
FIG. 10 is a flowchart illustrating form association to be performed when a button is selected.

A flow of the form association performed in step S912 of FIG. 9 when a button is selected will be described using FIG. 10.

In step S1001, the form recognition unit 405 acquires document data in the selected state in the document display region 505. In the case of the example illustrated in FIG. 5C, document data named "201806251100.pdf" in the selected state is acquired. In step S1002, the form recognition unit 405 creates a form from the acquired document data.

In step S1003, the form management unit 407 acquires, from the tab setting information in FIG. 7B, a button ID of the button selected from among the buttons arranged on the tabs in the tab list 501. For example, in a case where the "order receipt stamp" button in the tab list 501 illustrated in FIG. 5C is selected, a button ID "Button005" allocated to the "order receipt stamp" button is acquired from the tab setting information (FIG. 7B).

In step S1004, the form management unit 407 adds, to the form associating table as a record, the form information created in step S1002 and the button ID acquired in step S1003, in association with each other. In the example illustrated in Table 2, a state is illustrated in which the form 802 is created from the selected document data named "201806251100.pdf", and a record with an association ID "FormButton002" is added in association with a button ID "Button005".

TABLE 2

Table associating processing of button
and form that includes added record

| Association ID | Button ID | Form information |
| --- | --- | --- |
| FormButton001 | Button001 | (Columns of form 801, format, coordinate, link to image file, threshold of similarity degree determination, etc.) |
| FormButton002 | Button005 | (Columns of form 802, format, coordinate, link to image file, threshold of similarity degree determination, etc.) |

This time, the description has been given of a configuration in which the same "order receipt stamp" buttons having the same form information but having different button IDs are registered into the associating table as different records. Nevertheless, buttons having different button IDs but corresponding to the same processing and having the same form information may be registered as the same record.

By applying the present exemplary embodiment, it is possible to manage form information about a page selected by the user, and a button executed on the selected page, in association with each other. Then, by displaying a page having a specific format in an identifiable manner based on the associating table (Table 1 or 2), it is possible to save the user the trouble of identifying the corresponding page from among a plurality of pieces of document data, and check an execution target and the details of processing to be executed, before executing the processing of the button on the identified page.

In addition, in the first exemplary embodiment, after it is determined whether an operation button included in the associating table is included in a tab being selected, it is determined whether document data similar to a form associated with the operation button exists in the document display region 505. Nevertheless, the order and timings of determinations are not limited to those in this configuration. For example, after it is determined whether a form similar to a form of document data exists in the associating table, it may be determined whether an operation button associated with the form exists in a tab being selected.

Figure 15:
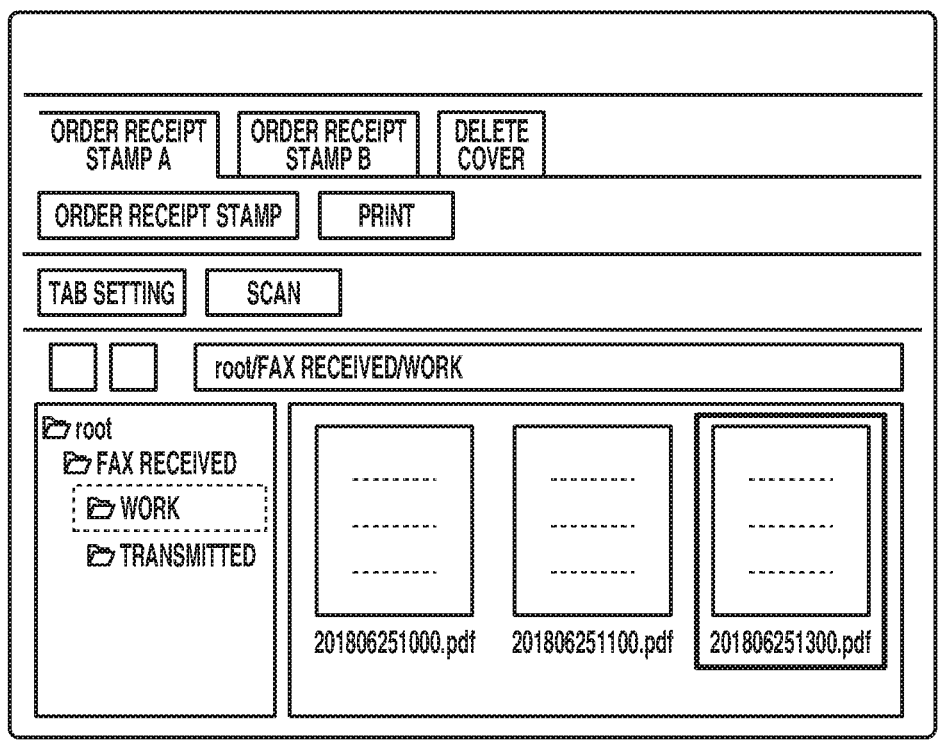
FIG. 15 illustrates a display mode of document data in a main window.

In addition, in the first exemplary embodiment, a configuration of notifying an execution target page to the user using a message (FIG. 11A or 11B) has been described. Nevertheless, an execution target page may be highlighted in the document display region 505. An example of a main window 500 displayed in this case is illustrated in FIG. 15. A page enclosed by a thick frame corresponds to the page notified using the message illustrated in FIG. 11A or 11B. In addition, in a case where property information or an index of document data is displayed in the document display region 505, property information or an index of the document data may be highlighted using bold face, an underline, a checkmark, or the like.

In addition, in the present exemplary embodiment, it is determined in step S913 whether a button included in a tab is also included in the associating table. Nevertheless, even in a case where a corresponding button does not exist on a tab, a message (FIG. 11A or 11B), highlighting (FIG. 15), or automatic execution on the corresponding page may be performed. At this time, in a conceivable flow, it is determined in step S904 "whether a form similar to the current document data exists in the associating table" without executing the processing in step S913, and after the execution of the processing in step S904, details of the processing of the button associated with form information in the associating table is stored, and the stored processing of the button is executed in step S909.

In addition, a timing of displaying the message (FIG. 11A or 11B) or performing highlighting (FIG. 15) may be a timing at which the user selects a corresponding button, or may be a timing at which processing of a button arranged immediately before the corresponding button is completed. Specifically, if the corresponding button is the "order receipt stamp" button, at a timing at which processing of the "split per page" button arranged immediately before the "order receipt stamp" button is completed, or a timing at which the "order receipt stamp" button is selected, a message as illustrated in FIG. 11A or 11B may be displayed or a page may be highlighted.

Hereinafter, a second exemplary embodiment will be described. In the method described in the first exemplary embodiment, for example, pieces of processing of buttons such as the "delete page" button and the "gather pages" button arranged in the tab list illustrated in FIG. 5E cannot be continuously executed in the arrangement order of the buttons. Although an order of buttons arranged in a tab list reflects an order of works expected by the user, only a single piece of processing can be executed, which is inconvenience.

In the second exemplary embodiment, a configuration for solving the above-described issues will be described using the drawings. A basic configuration is based on the first exemplary embodiment, and the descriptions of parts similar to those in the first exemplary embodiment will be omitted.

Figure 12:
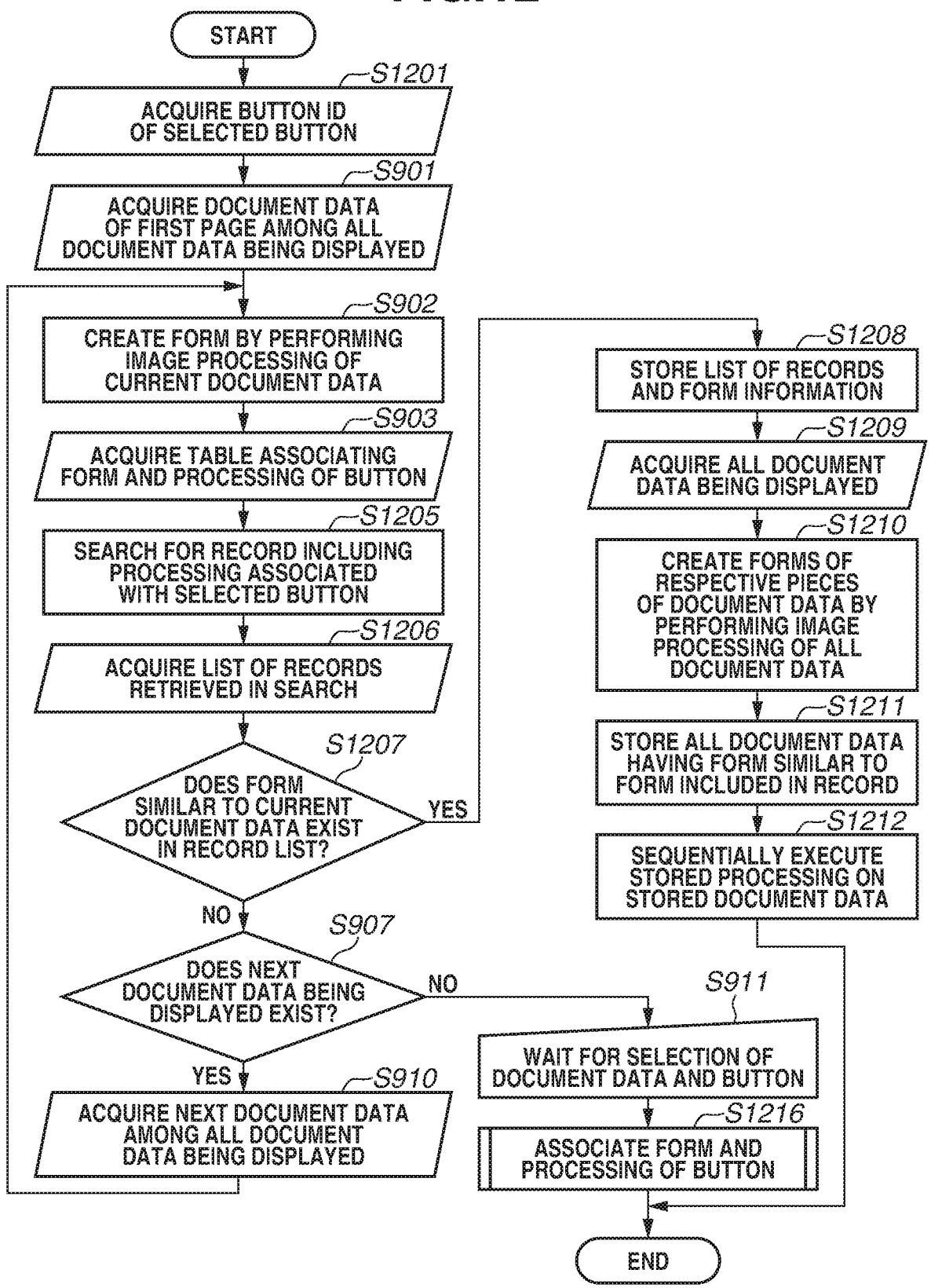
FIG. 12 is a flowchart illustrating a document operation to be performed when a button is selected.

A flow of document operations to be performed when a button arranged in a tab list is selected will be described using FIG. 12. Steps described in the first exemplary embodiment are assigned the same step numbers and the descriptions thereof will be omitted.

In step S1201, the form management unit 407 acquires, from the tab setting information in FIG. 7B, a button ID of a selected button from among the buttons arranged on the tabs in the tab list 501. For example, in a case where the "split per page" button arranged in the tab list 501 illustrated in FIG. 5E is selected, a button ID "Button007" is acquired based on the tab setting information in FIG. 7B.

An example of the associating table acquired by the form search unit 406 from the form management unit 407 in step S903 is shown in Table 3.

TABLE 3

Table associating processing of button and form according to second exemplary embodiment

| Association ID | Button ID | Form information |
|---|---|---|
| FormButton001 | Button007, Button008, Button009, | (Columns of form 803, format, coordinate, link to image file, threshold of similarity degree determination, etc.) |

In the example in Table 3, a list of button IDs "Button007", "Button008", and "Button009" is associated with the record with an association ID "FormButton001". These button IDs are respective button IDs allocated to the "split per page" button, the "delete page" button, and the "gather pages" button on the "delete cover" tab in FIG. 7B.

In step S1205, the form search unit 406 searches the associating table (Table 3) using the button ID acquired in step S1201. In step S1206, the form search unit 406 acquires a list of records retrieved in the search processing in step S1205.

In step S1207, the form search unit 406 confirms whether form information similar to the form created in step S902 exists in the record list acquired in step S1206. In a case where the form information similar to the form created in step S902 exists in the record list (YES in step S1207), the processing proceeds to step S1208. In a case where the form information does not exist in the record list (NO in step S1207), the processing proceeds to step S907.

In step S1208, a list of records including the button ID acquired in step S1201, and form information are temporarily stored. In the example in Table 3, a list of button IDs ("Button007", "Button008", and "Button009") acquired in step S1201 and form information are temporarily stored.

In step S1209, the form recognition unit 405 acquires all pieces of document data being displayed in the document display region 505. In step S1210, the form recognition unit 405 creates forms from the acquired all pieces of document data.

In step S1211, the form search unit 406 checks the forms of all pieces of document data created in step S1210, against the form information stored in step S1208, and temporarily stores pieces of document data determined to be similar to the form information stored in step S1208.

In step S1212, pieces of processing corresponding to the button IDs are sequentially executed in accordance with the list of button IDs stored in step S1208, on the pieces of document data temporarily stored in step S1211. When processing is executed, similarly to step S909 in FIG. 9, the processing may be executed after asking the user whether to execute the processing (FIG. 11A or 11B), or a series of operations may be automatically executed without asking the user.

After the selection operation of document data and the selection operation of a button arranged on a tab are received from the user, in step S1216, the form management unit 407 executes processing of adding new records to the associating table shown in Table 3. The details of the processing in step S1216 of FIG. 12 is similar to the processing in step S912 (FIG. 10) in the first exemplary embodiment.

The processing differs from the processing in the first exemplary embodiment in that, in step S1003, the form management unit 407 acquires buttons ID allocated to the selected button and a button arranged before the selected button on the tab in the tab list 501, from the tab setting information in FIG. 7B. For example, in a case where the "order receipt stamp" button in the tab list 501 in FIG. 5D is selected, a button ID "Button005" of the "order receipt stamp" button and a button ID "Button004" of the "split per page" button arranged before the "order receipt stamp" button are acquired from the tab setting information in FIG. 7B. In addition, an example of acquiring a button ID of the selected button and a button ID of a button arranged before the selected button has been described, but the number of button IDs to be acquired of buttons arranged near the selected button anteriorly or posteriorly is not especially limited.

For example, there exists a variation in which the numbers of preceding and subsequent buttons to be acquired are defined by the numbers set as fixed values. In a case where fixed values indicate two preceding buttons and one subsequent button, if the "delete page" button with a button ID "Button008" in the tab setting information in FIG. 7B is selected, button IDs "Button006", "Button007", "Button008", and "Button009" are acquired.

Figure 13:
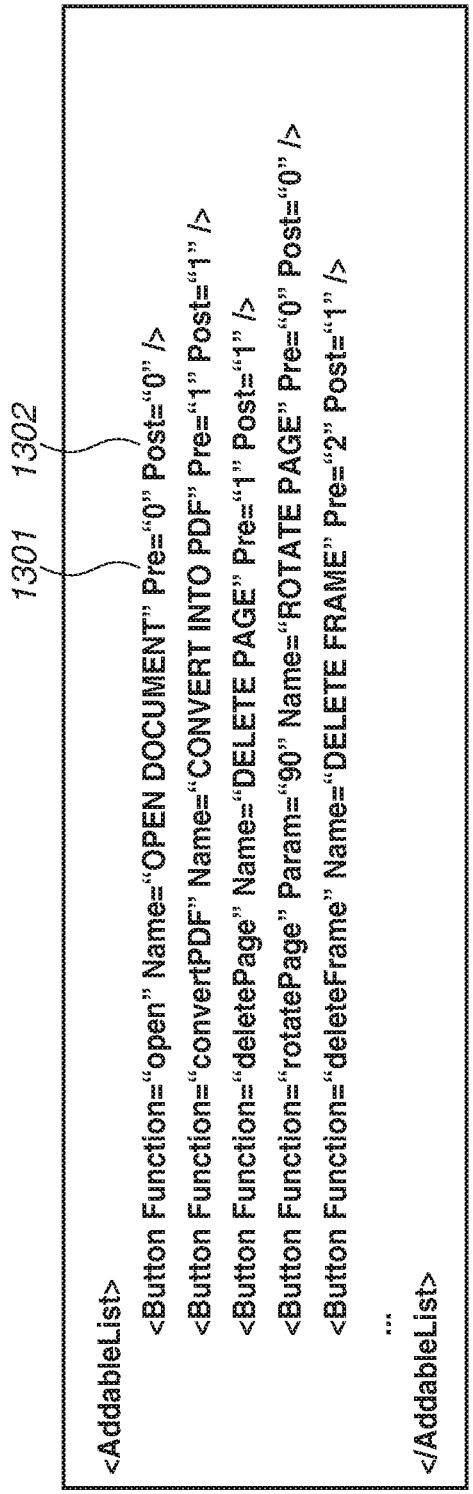
FIG. 13 illustrates extension of addable button information about a tab.

In addition, there exists a variation in which the addable button information 700 is extended as illustrated in FIG. 13, and the numbers of preceding and subsequent buttons to be acquired are controlled for each piece of processing of a button. A preceding processing number element 1301 and a subsequent processing number element 1302 indicate parameters for controlling how many pieces of preceding and subsequent processing of processing corresponding to the function element 703 are to be associated. For example, in the case of the example illustrated in FIG. 13, if the "delete page" button with the button ID "Button008" in the tab setting information in FIG. 7B is selected, a preceding processing number element 1 and a subsequent processing number element 1 of the function "deletePage" are applied, and button IDs "Button007", "Button008", and "Button009" are acquired.

Referring back to FIG. 10 (step S1216 of FIG. 12), in step S1004, the form management unit 407 adds, to the associating table (Table 3) as records, the form information created in step S1002 and the button IDs acquired in step S1003 in association with each other. An associating table in Table 4 illustrates a state caused after a record (FormButton002) is added in step S1004. The record of "FormButton002" indicates a state in which button IDs "Button004" and "Button005" are associated with the form 802 created from the document data named "201806251100.pdf".

TABLE 4

Table associating processing of button and form that includes added record according to second exemplary embodiment

| Association ID | Button ID | Form information |
| --- | --- | --- |
| FormButton001 | Button007, Button008, Button009, | (Columns of form 803, format, coordinate, link to image file, threshold of similarity degree determination, etc.) |
| FormButton002 | Button004, Button005 | (Columns of form 802, format, coordinate, link to image file, threshold of similarity degree determination, etc.) |

The processing according to the second exemplary embodiment has been described above. According to the present exemplary embodiment, a series of pieces of successive processing to be executed on a specific page can be effectively executed without selecting a plurality of operation buttons.

Hereinafter, a third exemplary embodiment will be described. In the first and second exemplary embodiments, the description has been given of a configuration in which processing of creating a form of document data and referring to an associating table is executed on all pieces of document data displayed in the document display region 505, and then, processing is executed on the pieces of document data. Nevertheless, in a case where the number of pages of pieces of document data displayed in the document display region 505 is large, it takes time until processing is executed on the pieces of document data (or until a message is displayed or until a specific page is highlighted), and the operability of the user is affected. In the present exemplary embodiment, a configuration considering the issue will be described.

The detailed descriptions of the parts described in the above exemplary embodiments will be omitted, and in the following description, the same step number is allocated to the already-described processing.

Processing to be performed in the case of the first exemplary embodiment will be described using FIG. 16.

In step S904, the form search unit 406 determines whether document data having a form included in an associating table exists in the document display region 505, and in a case where it is determined that the document data does not exist (NO in step S904), in steps S911-S912, processing of adding a record to the associating table is executed.

In a case where it is determined in step S904 that the document data exists (YES in step S904), in step S1501, the document management unit 402 executes processing on the document data acquired in step S901, without temporarily storing document data. Because the processing performed in step S1501 is similar to the processing performed in step S909, the description will be omitted. Then, after the processing is executed in step S1501, in step S907, it is determined whether the next document data exists.

In the case of the second exemplary embodiment, after a list of button IDs included in a record and form information are temporarily stored in step S1208, in step S1401, the form recognition unit 405 acquires document data corresponding to the first page, among pieces of document data displayed in the document display region 505. In step S1402, the form recognition unit 405 creates a form from the acquired document data.

In step S1403, the form search unit 406 confirms whether the form created in step S1402 and the form information stored in step S1208 are similar. In a case where the created form and the stored form information are similar (YES in step S1403), the processing proceeds to step S1404. In a case where the created form and the stored form information are not similar (NO in step S1403), the processing proceeds to step S1405.

After it is determined in step S1403 that the created form and the stored form information are similar (YES in step S1403), in step S1404, pieces of processing of buttons associated with the list of button IDs stored in step S1208 are executed on the document data acquired in step S1401, in the order of the list of button IDs.

After the processing is executed on the document data in step S1404, in step S1405, the form recognition unit 405 confirms whether document data corresponding to the next page exists in the document display region 505. In a case where the document data exists (YES in step S1405), the processing proceeds to step S1406, and in a case where the document data does not exist (NO in step S1405), the processing ends. In step S1406, the form recognition unit 405 acquires document data corresponding to the next page among a plurality of pieces of document data displayed in the document display region 505, and the processing in steps S1402-S1405 is repeated.

In addition, because the processing executed in step S1401 is the same as the processing executed in step S909 of the first exemplary embodiment, the description will be omitted.

According to the third exemplary embodiment, even in a case where the number of pages of pieces of document data displayed in the document display region 505 is large, a standby time until the display of a message (FIG. 11A or 11B), highlighting (FIG. 15), or automatic execution can be shortened, and processing can be effectively executed.

Figure 14:
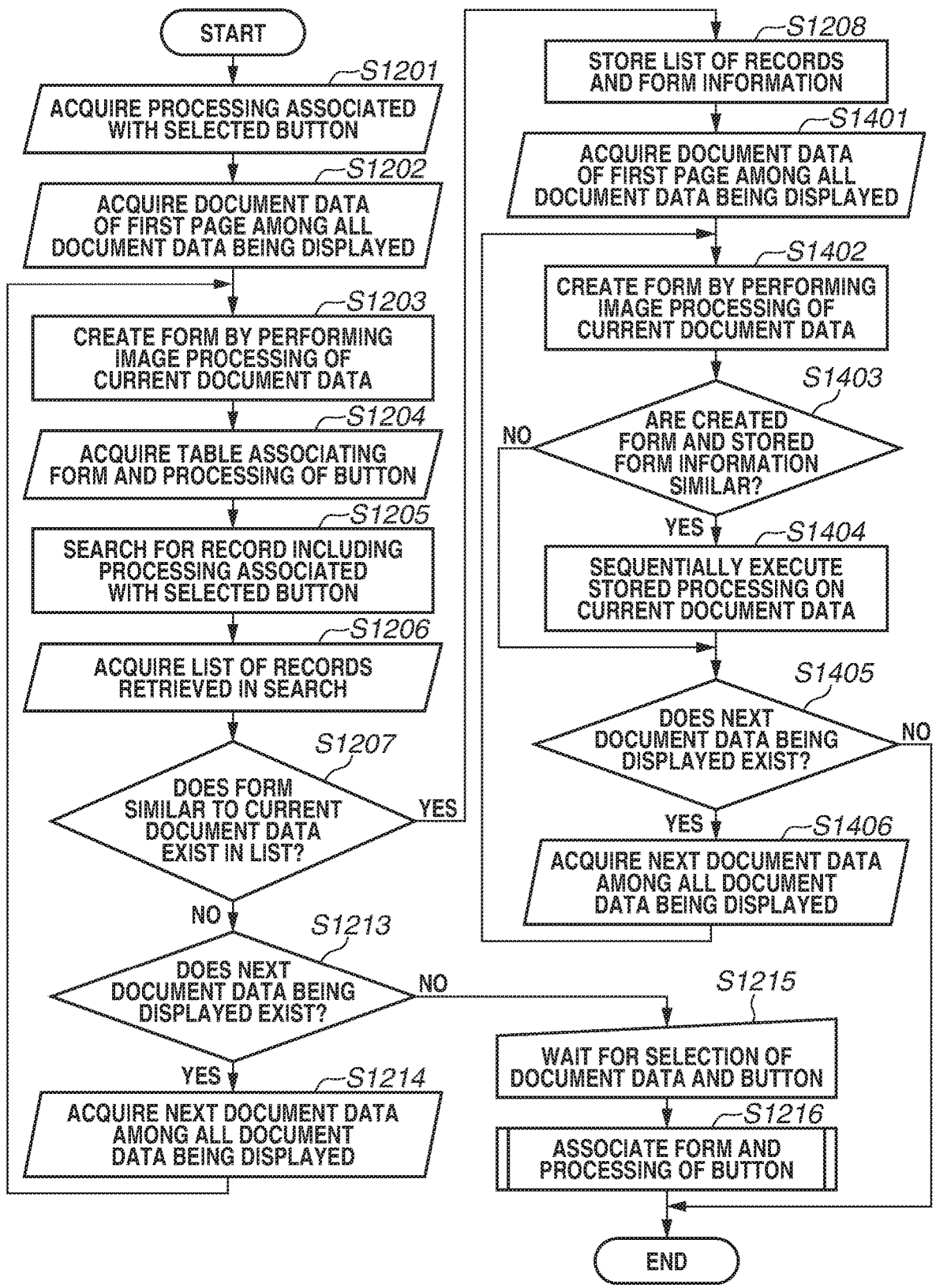
FIG. 14 illustrates another example of a flowchart illustrating a document operation to be performed when a button is selected.
Figure 16:
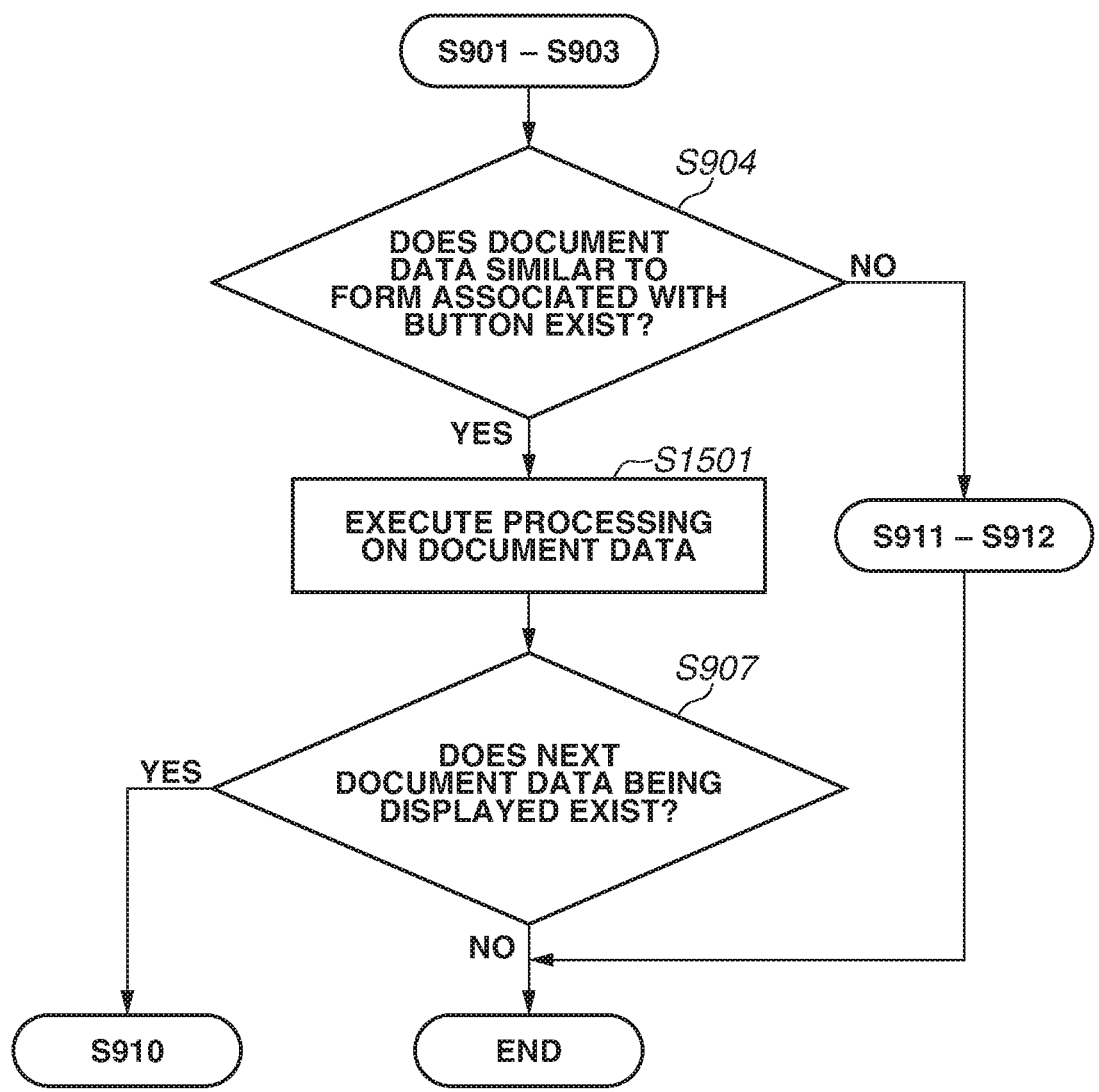
FIG. 16 illustrates an example of a flowchart illustrating a document operation according to a third exemplary embodiment.

As indicated in step S1401 of FIG. 14 and step S1501 of FIG. 16, the configuration of executing processing on document data corresponding to one page has been described, but pieces of document data corresponding to several pages may be temporarily stored, and processing may be executed on the pieces of temporarily-stored document data.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-228921, filed Dec. 6, 2018, which is hereby incorporated by reference herein in its entirety.

What is claimed is:

1. An information processing apparatus comprising:
at least one processor and at least one memory coupled to the at least one processor, the at least one memory having stored thereon instructions which, when executed by the at least one processor, cause the information processing apparatus to:
display a set of a plurality of operation buttons for executing processing on document data, wherein the set of the plurality of operation buttons among a plurality sets of operation buttons is displayed in a selectable state;
manage information regarding a form of a page and identification information of a first operation button processing that is executed on a page having the managed form;
determine whether newly-acquired document data includes a page having the managed form; and
in a case where the newly-acquired document data includes several pages determined to have the managed form, and where the first operation button included in the set of the plurality of operation buttons is selected, display a confirmation message for confirming, for the several pages included in the newly-acquired document data, whether or not to execute the processing of the first operation button.

2. The information processing apparatus according to claim 1,
wherein the set of the plurality of operation buttons is displayed on a tab in accordance with a predetermined order, and
wherein, by selecting the tab, a state can be switched to a state in which the set of the plurality of operation buttons is displayed or a state in which the set of the plurality of operation buttons is not displayed.

3. The information processing apparatus according to claim 1, wherein, in a case where newly-acquired document data includes a page having the managed form, and a tab includes an operation button managed by the information processing apparatus, the information processing apparatus displays the page having the managed form, in a state different from a page not having the managed form that is included in the newly-acquired document data.

4. The information processing apparatus according to claim 3, wherein the instructions, when executed by the at least one processor, cause the information processing apparatus to:
in a case where the newly-acquired document data does not include the page having the managed form, associate a form of a page selected by a user operation with processing corresponding to identification information of a selected operation button.

5. The information processing apparatus according to claim 3, wherein the instructions, when executed by the at least one processor, cause the information processing apparatus to:
in a case where the newly-acquired document data does not include the page having the managed form, associate a form of a page selected by a user operation with processing corresponding to identification information of a selected operation button; and
display a set of a plurality of operation buttons for executing processing on page data corresponding to at least one page among a plurality of pages in the newly-acquired document data.

6. The information processing apparatus according to claim 1, wherein the instructions, when executed by the at least one processor, cause the information processing apparatus to:
in a case where a plurality of operation buttons to be executed only on a page selected by a user operation is continuously executed as a series of pieces of processing, associate pieces of processing of the plurality of operation buttons to be executed as the series of pieces of processing with information regarding the form of the page on which the plurality of operation buttons is executed as the series of pieces of processing.

7. The information processing apparatus according to claim 1, wherein, in a case where a form of a first page included in a plurality of pages included in the document data is the managed form, and a tab includes an operation button managed by the information processing apparatus, after the first page is displayed in an identifiable manner, it is determined whether a second page having the managed form that is other than the first page exists in the document data.

8. The information processing apparatus according to claim 1, wherein the information regarding the form of the page is format information obtained by segmenting a character string or an image included in the page, into rectangular regions.

9. The information processing apparatus according to claim 1, wherein the confirming message is displayed when a user selects the first operation button.

10. The information processing apparatus according to claim 1, wherein the form refers to a format in which character strings, drawings, tables and images read from the document data are segmented into rectangular regions.

11. The information processing apparatus according to claim 1, wherein the instructions, when executed by the at least one processor, cause the information processing apparatus to:
    display a set of a plurality of operation buttons for executing processing on page data corresponding to at least one page among a plurality of pages in the newly-acquired document data.

12. A non-transitory storage medium storing one or more programs including instructions, which when executed by one or more processors of an information processing apparatus, cause the information processing apparatus to perform a method comprising:
    displaying a set of a plurality of operation buttons for executing processing on document data, wherein the set of the plurality of operation buttons among a plurality sets of operation buttons is displayed in a selectable state;
    managing information regarding a form of a page and identification information of a first operation button processing that is executed on a page having the managed form;
    determining whether newly-acquired document data includes a page having the managed form; and
    in a case where the newly-acquired document data includes several pages determined to have the managed form, and where the first operation button included in the set of the plurality of operation buttons is selected, displaying a confirmation message for confirming, for the several pages included in the newly-acquired document data, whether or not to execute the processing of the first operation button.

13. A control method for an information processing apparatus, the control method comprising:
    displaying a set of a plurality of operation buttons for executing processing on document data, wherein the set of the plurality of operation buttons among a plurality sets of operation buttons is displayed in a selectable state;
    managing information regarding a form of a page and identification information of a first operation button processing that is executed on a page having the managed form;
    determining whether newly-acquired document data includes a page having the managed form; and
    in a case where the newly-acquired document data includes several pages determined to have the managed form, and where the first operation button included in the set of the plurality of operation buttons is selected, displaying a confirmation message for confirming, for the several pages included in the newly-acquired document data, whether or not to execute the processing of the first operation button.

\* \* \* \* \*